United States Patent
Harada

(10) Patent No.: US 11,818,795 B2
(45) Date of Patent: Nov. 14, 2023

(54) TERMINAL, RADIO COMMUNICATION METHOD, AND SYSTEM

(71) Applicant: NTT DOCOMO, INC., Tokyo (JP)

(72) Inventor: Hiroki Harada, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 17/054,081

(22) PCT Filed: May 10, 2018

(86) PCT No.: PCT/JP2018/018232
§ 371 (c)(1),
(2) Date: Nov. 9, 2020

(87) PCT Pub. No.: WO2019/215901
PCT Pub. Date: Nov. 14, 2019

(65) Prior Publication Data
US 2021/0297884 A1    Sep. 23, 2021

(51) Int. Cl.
*H04B 7/0404*    (2017.01)
*H04B 7/0408*    (2017.01)
(Continued)

(52) U.S. Cl.
CPC ............ *H04W 8/22* (2013.01); *H04B 7/0404* (2013.01); *H04B 7/0408* (2013.01); *H04B 7/12* (2013.01);
(Continued)

(58) Field of Classification Search
CPC ... H04B 7/02–12; H04B 17/0082–3913; H04J 11/0023–0093; H04J 2011/0003–0096; H04L 5/0001–0098; H04W 8/22–245; H04W 24/02–10; H04W 28/02–26; H04W 36/0005–385; H04W 48/02–20; H04W 56/0005–0095; H04W 72/005–14; H04W 74/002–008;
(Continued)

(56) References Cited

U.S. PATENT DOCUMENTS

2018/0049047 A1*  2/2018  Lin .................. H04W 72/04
2019/0273584 A1*  9/2019  Kazmi .............. H04L 5/0035

OTHER PUBLICATIONS

NTT Docomo, Inc., "[draft] CR on scheduling availability during intra-frequency measurement", 3GPP TSG-RAN4 Meeting #86bis, R4-1805963, Melbourne, Australia, Apr. 16-20, 2018 (3 pages) (Year: 2018).*

(Continued)

*Primary Examiner* — Timothy J Weidner
(74) *Attorney, Agent, or Firm* — Osha Bergman Watanabe & Burton LLP

(57) ABSTRACT

A terminal is disclosed including a processor coupled to a receiver that performs a measurement for a radio link monitoring (RLM) using a reference signal for the RLM; and controls, based on a subcarrier spacing (SCS) of the reference signal, a scheduling restriction on data during the measurement for the RLM, wherein the processor assumes that a condition for enabling transmission or reception of the data during the measurement for the RLM is more moderate than a condition for enabling transmission or reception of data during a radio resource management (RRM) measurement. In other aspects, a radio communication method and a system are also disclosed.

9 Claims, 10 Drawing Sheets

(51) Int. Cl.

| | |
|---|---|
| H04B 7/12 | (2006.01) |
| H04B 17/21 | (2015.01) |
| H04B 17/24 | (2015.01) |
| H04B 17/382 | (2015.01) |
| H04J 11/00 | (2006.01) |
| H04L 5/00 | (2006.01) |
| H04W 8/22 | (2009.01) |
| H04W 24/02 | (2009.01) |
| H04W 24/08 | (2009.01) |
| H04W 24/10 | (2009.01) |
| H04W 72/02 | (2009.01) |
| H04W 72/12 | (2009.01) |
| H04W 84/02 | (2009.01) |
| H04W 88/06 | (2009.01) |
| H04W 88/08 | (2009.01) |
| H04W 92/02 | (2009.01) |
| H04W 92/10 | (2009.01) |
| H04W 72/1263 | (2023.01) |

(52) U.S. Cl.
CPC .......... *H04B 17/21* (2015.01); *H04B 17/24* (2015.01); *H04B 17/382* (2015.01); *H04J 11/0079* (2013.01); *H04J 11/0083* (2013.01); *H04J 11/0086* (2013.01); *H04L 5/0044* (2013.01); *H04L 5/0048* (2013.01); *H04L 5/0094* (2013.01); *H04W 24/02* (2013.01); *H04W 24/08* (2013.01); *H04W 24/10* (2013.01); *H04W 72/02* (2013.01); *H04W 72/12* (2013.01); *H04W 72/1263* (2013.01); *H04W 84/02* (2013.01); *H04W 88/06* (2013.01); *H04W 88/08* (2013.01); *H04W 92/02* (2013.01); *H04W 92/10* (2013.01)

(58) Field of Classification Search
CPC ..... H04W 76/10–50; H04W 84/02–16; H04W 88/02–12; H04W 92/02; H04W 92/04; H04W 92/10
See application file for complete search history.

(56) References Cited

OTHER PUBLICATIONS

Ericsson; "WF on remaining RLM issues with RAN4 impact"; 3GPP TSG RAN WG1 Meeting #89ah-NR, R1-1711901; Qingdao, China; Jun. 27-30, 2017 (6 pages).

Huawei, HiSilicon; "Initial consideration on UE measurement capabilities"; 3GPP TSG-RAN WG4 Meeting #83, R4-1704988; Hangzhou, China; May 15-19, 2017 (6 pages).

Ericsson; "Further considerations on RLM for NR"; 3GPP TSG RAN WG4 Meeting #83, R4-1705610; Hangzhou, P.R. of China; May 15-19, 2017 (3 pages).

International Search Report issued in PCT/JP2018/018232 dated Jun. 12, 2018 (2 pages).

Written Opinion of the International Searching Authority issued in PCT/JP2018/018433 dated Jul. 17, 2018 (5 pages).

NTT Docomo; "Way forward on UE behavior during measurement outside measurement gap"; 3GPP TSG-RAN WG4 NR-AH#4, R4-1800566; San Diego, US; Jan. 22-26, 2018 (6 pages).

3GPP TS 36.300 V8.12.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8)" Mar. 2010 (149 pages).

Extended European Search Report issued in Application No. 18918084.7 dated Dec. 2, 2021 (11 pages).

NTT Docomo, Inc., "Remaining issues on RLM for mobility management", 3GPP TSG RAN WG1 Meeting #92bis, R1-1805038, Sanya, China, Apr. 16-20, 2018 (3 pages).

Nokia, Nokia Shanghai Bell, "CR to section 8.1 for remaining open issues in RLM", 3GPP TSG-RAN WG4#86bis, R4-1805524, Melbourne, Australia, Apr. 16-20, 2018 (6 pages).

NTT Docomo, Inc., "[draft] CR on scheduling availability during intra-frequency measurement", 3GPP TSG-RAN4 Meeting #86bis, R4-1805963, Melbourne, Australia, Apr. 16-20, 2018 (3 pages).

* cited by examiner

TERMINAL, RADIO COMMUNICATION METHOD, AND SYSTEM

TECHNICAL FIELD

The present disclosure relates to a user terminal in next-generation mobile communication systems.

BACKGROUND ART

In the UMTS (Universal Mobile Telecommunications System) network, the specifications of Long Term Evolution (LTE) have been drafted for the purpose of further increasing high speed data rates, providing lower latency and so on (see Non-Patent Literature 1). For the purpose of further high capacity, advancement of LTE (LTE Rel. 8, Rel. 9), and so on, the specifications of LTE-A (LTE-Advanced, LTE Rel. 10, Rel. 11, Rel. 12, Rel. 13) have been drafted.

Successor systems of LTE (referred to as, for example, "FRA (Future Radio Access)," "5G (5th generation mobile communication system)," "5G+ (plus)," "NR (New Radio)," "NX (New radio access)," "FX (Future generation radio access)," "LTE Rel. 14," "LTE Rel. 15" (or later versions), and so on) are also under study.

In existing LTE systems (for example, LTE Rel. 8 to Rel. 13), a user terminal (UE (User Equipment)) detects a synchronization signal (SS), achieves synchronization with a network (for example, a base station (eNB (eNode B)), and identifies a cell to be connected (for example, identifies by a cell ID (Identifier)). Such a process is also referred to as a "cell search." For example, the synchronization signal includes an PSS (Primary Synchronization Signal) and/or an SSS (Secondary Synchronization Signal).

A UE receives broadcast information (for example, a master information block (MIB), a system information block (SIB), and the like) and acquires configuration information (which may also be referred to as "system information," and the like) for communication with the network.

The MIB may be transmitted on a broadcast channel (PBCH (Physical Broadcast Channel)). The SIB may be transmitted on a downlink (DL) shared channel (PDSCH (Physical Downlink Shared Channel)).

CITATION LIST

Non-Patent Literature

Non-Patent Literature 1: 3GPP TS 36.300 V8.12.0 "Evolved Universal Terrestrial Radio Access (E-UTRA) and Evolved Universal Terrestrial Radio Access Network (E-UTRAN); Overall description; Stage 2 (Release 8)," April, 2010

SUMMARY OF INVENTION

Technical Problem

In future radio communication systems (also written simply as "NR" hereinafter), a measurement using a synchronization signal block (SSB) is used. SSB-based measurement timing configuration (SMTC) is reported to a UE. The UE performs a measurement based on an SSB of a measurement target (which may also be referred to as an "SSB measurement") in a configured SMTC window.

For NR, transmission and/or reception operation of data in the timing same as the SSB measurement is under study. For example, it is under study that it may be expected that there are no scheduling restrictions of data of the same SCS in a period to carry out the SSB measurement of a certain numerology in a particular frequency band.

However, data transmission and/or reception operation in a case of performing a measurement other than the SSB measurement (a measurement based on channel state information-reference signal (CSI-RS), and the like) is not studied. When data transmission and/or reception operation during a measurement other than the SSB measurement is not defined appropriately, communication throughput decreases, which is a problem.

Thus, the present disclosure has an object to provide a user terminal which can appropriately control, even in a case of performing a measurement other than an SSB measurement, data transmission and/or reception which is simultaneous with the measurement.

Solution to Problem

A user terminal according to one aspect of the present disclosure includes: a measurement section that performs measurement for radio link monitoring (RLM) by using a certain reference signal in a particular frequency band; and a control section that controls data transmission and/or reception on the particular frequency band at a time of the measurement, based on a sub-carrier spacing (SCS) of the certain reference signal.

Advantageous Effects of Invention

According to one aspect of the present disclosure, even in a case of performing a measurement other than an SSB measurement, data transmission and/or reception which is simultaneous with the measurement can be appropriately controlled.

DESCRIPTION OF EMBODIMENTS (SSB Measurement)

Figure 1:
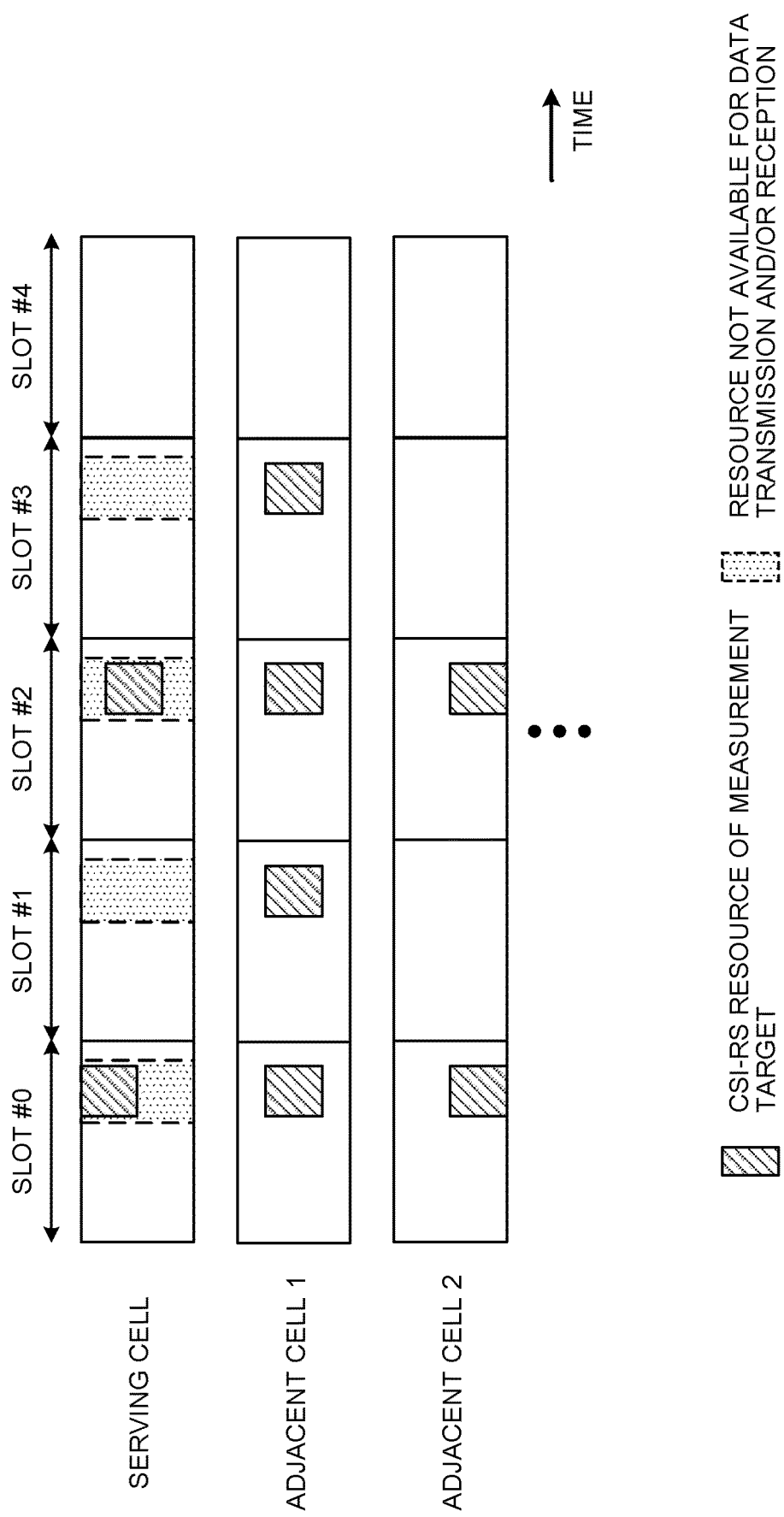
FIG. 1 is a diagram to show an example of scheduling restrictions in a case that synchronous environment can be expected.

In existing LTE systems, a UE supports inter-frequency measurement, which performs a measurement in a non-serving carrier different from a serving carrier in connection.

In a measurement gap (MG), the UE switches a use frequency (RF (Radio Frequency)) from the serving carrier to the non-serving carrier (performs retuning), and after having measured by using a reference signal, or the like, switches the use frequency from the non-serving carrier to the serving carrier.

Here, the MG is a period to perform the inter-frequency measurement, and the UE stops transmission and/or reception in the carrier in communication in the period and performs a measurement in a carrier of another frequency.

In LTE, transmission and/or reception in the serving cell cannot be performed while measuring an inter-frequency carrier by using the MG due to switching the RF. On the other hand, in other cases (for example, intra-frequency measurement), constraints in transmission and/or reception do not occur associated with a measurement.

In NR, following measurements are studied:
(1) Intra-frequency measurement without MG,
(2) Intra-frequency measurement with MG, and
(3) Inter-frequency measurement.

The above-described (1) intra-frequency measurement without MG is also referred to as "intra-frequency measurement without the need for RF retuning." The above-described (2) intra-frequency measurement with MG is also referred to as "intra-frequency measurement in need of RF retuning." For example, in a case that a measurement target signal is not included in a band of an active BWP (Band-Width Part), RF retuning is necessary for the intra-frequency measurement, and hence the measurement is the measurement of the above-described (2).

Here, the BWP corresponds to one or more partial frequency bands in a component carrier (CC) configured in NR. The BWP may be referred to as a "partial frequency band," a "partial band," and the like.

The above-described (3) inter-frequency measurement is also referred to as "different-frequency measurement." The inter-frequency measurement expects using an MG. However, in a case that the UE reports UE capability of a gap less measurement to a "base station" (for example, a "BS (Base Station)," a "transmission/reception point (TRP)," an "eNB (eNodeB)," a "gNB (NR NodeB)," and the like), inter-frequency measurement without MG is possible.

The UE may perform intra-frequency measurement of the serving cell in a certain carrier, or may perform at least one of intra-frequency measurement and inter-frequency measurement of an adjacent cell (which may be referred to as a "neighbour cell"). In NR, transmission and/or reception in the serving cell cannot be performed while measuring an intra-frequency carrier or an inter-frequency carrier by using the MG due to switching the RF.

In LTE, NR, and the like, at least one of reference signal received power (RSRP), a received signal strength (RSSI (Received Signal Strength Indicator)), reference signal received quality (RSRQ), and an SINR (Signal to Interference plus Noise Ratio) of a non-serving carrier may be measured with respect to intra-frequency measurement and/or inter-frequency measurement.

Here, the RSRP is received power of a desired signal, and for example, is measured by using at least one of a cell-specific reference signal (CRS), a channel state information-reference signal (CSI-RS), and the like. The RSSI is received power of the total including a received power of a desired signal and an interference and noise power. The RSRQ is a ratio of the RSRP with respect to the RSSI.

The desired signal may be a signal included in a synchronization signal block (SSB). The SSB is a signal block including a synchronization signal (SS) and a broadcast channel (also referred to as a "broadcast signal," a "PBCH," an "NR-PBCH," and the like), and may be referred to as an "SS/PBCH block," and the like.

The SS included in the SSB may include a primary synchronization signal (PSS), a secondary synchronization signal (SSS), and the like. The SSB is constituted with one or more symbols (for example, OFDM symbols). In the SSB, a PSS, an SSS, and a PBCH may be placed in one or more different symbols from each other. For example, the SSB may be constituted with 4 or 5 symbols in total including 1 symbol of PSS, 1 symbol of SSS, and 2 or 3 symbols of PBCH.

Note that the measurement performed by using the SS (or the SSB) may be referred to as an "SS (or SSB) measurement." For example, as the SS (or SSB) measurement, SS-RSRP, SS-RSRQ, an SS-SINR measurement, and the like may be performed. A demodulation reference signal (DMRS) and the like corresponding to the PSS, the SSS, and the PBCH may be used for the SS (or SSB) measurement.

The UE may perform communication (transmission and/or reception of a signal, a measurement, and the like) by using at least one frequency band (carrier frequency) of a first frequency band (FR1 (Frequency Range 1)) and a second frequency band (FR2 (Frequency Range 2)).

For example, FR1 may be a frequency band of 6 GHz or less (sub-6 GHz), and FR2 may be a frequency band which is higher than 24 GHz (above-24 GHz). FR1 may be defined as a frequency range in which at least one of 15, 30, and 60 kHz is used as the sub-carrier spacing (SCS), and FR2 may be defined as a frequency range in which at least one of 60 and 120 kHz is used as SCS. Note that frequency bands, definitions and so on of FR1 and FR2 are by no means limited to these, and for example, FR1 may be a frequency band which is higher than FR2.

FR2 may be used only for a time division duplex (TDD) band. It is preferable that FR2 is used in synchronous operation between a plurality of base stations. In a case that a plurality of carriers are included in FR2, it is preferable that these carriers are used in the synchronous operation.

The UE may be reported (configured) of information about intra-frequency measurement and/or inter-frequency measurement (for example, "MeasObjectNR" information element), for example, by using higher layer signaling, physical layer signaling, or a combination thereof, from the base station.

Here, for example, the higher layer signaling may be any one or combinations of RRC (Radio Resource Control) signaling, MAC (Medium Access Control) signaling, broadcast information, and the like.

For example, the MAC signaling may use MAC control elements (MAC CE), MAC PDUs (Protocol Data Units), and the like. For example, the broadcast information may be master information blocks (MIBs), system information blocks (SIBs), minimum system information (RMSI (Remaining Minimum System Information)), and the like.

The information about intra-frequency measurement and/or inter-frequency measurement may include information that is applicable to intra-frequency measurement, inter-frequency measurement, and the like, using the SSB and/or the CSI-RS. For example, the information about intra-frequency measurement and/or inter-frequency measurement may include a frequency band (carrier) of the measurement target, presence or absence of synchronization of the carrier of the measurement target, the resource location (slot number, symbol number, RB index, and the like) of the signal (DMRS, CSI-RS, and the like) of the measurement target, timing configuration of an SSB measurement (SMTC (SSB-based Measurement Timing Configuration)), an index of the SSB of the measurement target, and the like. The SSB index may be associated with the resource location of the SSB.

Note that the presence or absence of the synchronization of the carrier of the measurement target may be configured by the RRC signaling to the UE by using the information (which may be referred to as a parameter "useServingCellTimingForSync") about whether the measurement target carrier synchronizes with the serving cell (whether an index of the SSB transmitted by a neighbour cell may be derived based on the timing of the serving cell) for example. The information may be referred to as "information about SSB index derivation," "information about carrier (or cell) synchronization," and the like.

In a case that the information (for example, "MeasObjectNR" information element) about intra-frequency measurement and/or inter-frequency measurement includes useServingCellTimingForSync, useServingCellTimingForSync may be expected to be enabled. In a case that useServingCellTimingForSync is not included, useServingCellTimingForSync may be expected to be disabled.

Note that in a case that a plurality of carriers (or a plurality of cells) synchronize, the UE may expect that the radio frame boundaries (or frame timing) between these carriers or cells matches, or may expect that the system frame number (SFN) matches, or may expect both of them.

The location of the SSB of the measurement target in the SMTC period may be reported by a bit map (which may be referred to as a parameter "ssb-ToMeasure"). The bit map may be associated with a frequency band of the measurement target. For example, the higher the frequency band of the measurement target is, the longer bit map may be used to report the SSB index.

The SMTC may include a length, a cycle, a timing offset and the like of the SSB measurement period (which may be referred to as an "SMTC window," "measurement timing," and the like). The UE performs a measurement based on the SSB of the measurement target in a configured SMTC window.

UE capability signaling for configuring an MG for inter-frequency measurement may be supported. For example, as the UE capability signaling, respective MGs for inter-frequency measurement of FR1 and FR2 can be configured separately.

For example, the UE may report the capability signaling including an MG length (or duration), an MG repetition cycle, and the like, for a gap to correspond to at least one of FR1 specific, FR2 specific, and UE specific.

(SSB Measurement and Data Transmission and/or Reception)

For NR, it is also studied to transmit and/or receive data in a symbol configured with an SSB to enable flexible control. In a case that numerology of the SSB and numerology of the data and/or a control channel of the serving cell are different from each other, whether the UE can process these signals different in numerology at the same time (including at least one of simultaneous transmission, simultaneous reception, simultaneous transmission and reception, and the like) may depend on the UE capability. For example, it may be expected that the UE which does not have capability for such simultaneous processing cannot perform data transmission and/or reception during the SSB measurement.

Note that, for example, the numerology corresponds to an SCS. In the present disclosure, the numerology and the SCS may be interchangeably interpreted. In the present disclosure, the term "data" may be interchangeably interpreted with at least one of data, a control channel, and a reference signal. For example, "data" may be interchangeably interpreted with a PUCCH/PUSCH or may be interchangeably interpreted with a PDCCH/PDSCH. The data transmission and/or reception may mean at least one of PUCCH/PUSCH transmission and PDCCH/PDSCH reception in the serving cell.

Note that the UE may support simultaneous transmission and/or reception of data and an SSB of different numerology, and having such capability may be reported to the base station by the UE capability information (simultaneousRxDataSSB-DiffNumerology. The UE having the capability may perform at least one of reception of an SSB and reception and transmission of data simultaneously. Note that the above-described capability may be interchangeably interpreted with capability (intraCarrierConcurrentMeas) about simultaneous measurement in a carrier. Note that the names such as simultaneousRxDataSSB-DiffNumerology, and the like are not limited to these.

In FR1, regardless of synchronous environment and non-synchronous environment, in a case that an SSB of a certain SCS is measured, it may be expected that there are no scheduling restrictions of data of the same SCS. In other words, in a case that SCSs are the same between the SSB and data, the UE may transmit and/or receive the data during the SSB measurement.

In FR1, in a case of measuring an SSB of a certain SCS, data of different SCSs may be limited. Because there is possibility of both bands of frequency division duplex (FDD) and the TDD in FR1, both cases of synchronization and the non-synchronization are considered. For example, the UE which cannot perform simultaneous processing of an SSB and data of different SCSs may follow at least one of the following scheduling restrictions in the case of performing the SSB measurement of FR1:

(1) in a case that NW (or a measurement target carrier) synchronizes (for example, useServingCellTimingForSync is enabled), the UE is not expected that the UE transmits and/or receives data (or cannot transmit and/or receive data) of an SCS that is different from the SCS of the SSB in an SSB symbol to measure in the SMTC window and 1 symbol before and after the SSB symbol in contiguous SSB symbols, (2) In a case that NW (or a measurement target carrier) does not synchronize (for example, useServingCellTimingForSync is not enabled), the UE is not expected that the UE transmits and/or receives data of an SCS that is different from the SCS of the SSB in all symbols in the SMTC window (or the UE cannot transmit and/or receive data).

Note that "not to expect transmitting and/or receiving" may be interchangeably interpreted with "to disable transmission and/or reception," "not to perform transmission and/or reception," "to limit transmission and/or reception," and "to expect unable to perform transmission and/or reception." A NW or a measurement target carrier synchronizing (not synchronizing) may be interchangeably interpreted with the UE being able to expect synchronous environment (not able to expect). A symbol may be referred to as a "data symbol" in a case of being used for data transmission and/or reception.

The above-described (1) is based on assumption of a symbol of an SSB and 1 symbol before and after the symbol as time resources that may be affected by the SSB measurement in a synchronous environment, in consideration of an SSB of a neighbour cell arriving at the UE with time lag according to a propagation delay difference. The above-described (2) is based on assumption of all symbols in the window as time resources that may be affected by the SSB measurement since it cannot be predicted that an SSB is received in which symbol in the SMTC window in a non-synchronous environment.

Note that in a case that intra-band CA is performed in FR1, regardless of synchronous/non-synchronous environment, SCS, and the like, scheduling restrictions may be applied to all serving cells of the band. For example, in a case that intra-band CA are performed on two CCs in FR1, when performing the SSB measurement in one CC, it may be expected that data transmission and/or reception of the other CC is affected by scheduling restrictions. In a case that inter-band CA is performed in FR1, regardless of synchronous/non-synchronous environment, SCS, and the like, it may be expected that there are no scheduling restrictions.

Note that CA may be interchangeably interpreted with other terms, and for example, may be interchangeably interpreted with dual connectivity (DC), and the like.

FR2 is a TDD band, and hence it is sufficient by considering the case of the synchronous environment. In FR2, it is expected that when performing the SSB measurement, the UE performs reception BF (Beam Forming) by using analog BF. In this case, a case is expected that data reception from the serving cell cannot be performed at the same time when the UE directs a beam to a neighbour cell direction for the SSB measurement of the neighbour cell. Thus, it may be expected that the UE cannot perform data transmission and/or reception during the SSB measurement in FR2 regardless of the UE capability and the SCS.

For example, the case of performing the SSB measurement of FR2 may follow the following scheduling restrictions: the UE is not expected that the UE performs data transmission and/or reception in an SSB symbol to measure in the SMTC window and 1 symbol before and after in contiguous SSB symbols (or the UE cannot perform data transmission and/or reception). Note that, at the time of the SS-RSRQ measurement, the "SSB symbol" may be interchangeably interpreted with an "SSB symbol and RSSI measurement symbol."

Note that in a case that intra-band CA is performed in FR2, scheduling restrictions may be applied to all serving cells of the band. In a case that inter-band CA is performed in FR2, scheduling restrictions may be applied to all serving cells of the inter-band (both bands).

In a case that inter-band CA is performed in FR1 and FR2, it may be expected that there are no scheduling restrictions.

Data transmission and/or reception operation in a certain serving cell during CA may be determined in consideration of the measurement timing information (for example, SMTC, an SSB index, and the like) in other serving cells. At the time of intra-band CA, information about whether intra-frequency measurement in the SCell (secondary cell) frequency is available may be reported to the UE. The UE may control implementation of the intra-frequency measurement in the SCell frequency, based on the information.

Alternatively, the UE may perform channel state information-reference signal (CSI-RS) based intra-frequency measurement and/or inter-frequency measurement.

The UE may perform a measurement for radio link monitoring (RLM) (which be referred to as an "RLM (Radio Link Monitoring) measurement"). When radio link failure (RLF) is detected by the RLM, re-establishment of the RRC connection may be performed. An RLM reference signal (RLM-RS) may be at least one of an SSB, a CSI-RS, a PSS, an SSS, a DMRS, a mobility reference signal (MRS (Mobility RS)), a beam specific signal, and the like, or may be a signal configured with these extensions, modifications, and the like.

The UE may perform a measurement for L1-RSRP (reference signal received power (RSRP) in a physical layer. An L1-RSRP reference signal may be at least one of an SSB, a CSI-RS, a PSS, an SSS, a DMRS, an MRS, a beam specific signal, and the like, or may be a signal configured with these extensions, modifications, and the like.

The UE may perform a measurement for beam failure detection. A beam failure detection reference signal may be at least one of an SSB, a CSI-RS, a PSS, an SSS, a DMRS, an MRS, a beam specific signal, and the like, or may be a signal configured with these extensions, modifications, and the like.

The L1-RSRP measurement and the measurement for beam failure detection are measurements of the physical layer, the L1-RSRP measurement and the measurement for beam failure detection may be referred to as an "L1 measurement (Layer 1 measurement)." The L1-RSRP reference signal and the beam failure detection reference signal may be referred to as an "L1 measurement reference signal (L1-RS)."

Those that have been studied in NR until now is data transmission and/or reception operation in a case of performing SSB based intra-frequency measurement and/or inter-frequency measurement (SSB measurement) as mentioned above. However, data transmission and/or reception operation in a case of performing CSI-RS based intra-frequency measurement and/or inter-frequency measurement (CSI-RS measurement), an RLM measurement, and the L1 measurement is not studied.

For example, in a case that the SCS of data is different from the SCS of the RLM-RS (or L1-RS), it is not studied whether it is possible to transmit and/or receive these at the same time. It is not studied whether or not RLM (or L1-RSRP) analog BF is the same as analog BF of the data reception in FR2.

There is a problem that communication throughput decreases if data transmission and/or reception operation is not defined appropriately in a case of performing a CSI-RS measurement, an RLM measurement and an L1 measurement.

Thus, the innovators of the present invention came up with the idea of a UE operation in the case of performing a CSI-RS measurement, an RLM measurement, and an L1 measurement.

Embodiments according to the present disclosure will be described in detail with reference to the drawings as follows. The radio communication method according to each embodiment may be employed independently or may be employed in combination.

Note that "1 symbol before and after" in the following embodiments may be interchangeably interpreted with "a certain number of symbols in at least one of before and after (in terms of time)," and "a first number of symbols before and a second number of symbols after (in terms of time)." For example, the certain number, the first number, and the second number may be 1, 2, or 3 symbols, and the like. The first number and the second number do not need to be the same.

(Radio Communication Method)

First Embodiment

The first embodiment relates to data transmission and/or reception at the time of the CSI-RS measurement.

In FR1, regardless of synchronous environment and non-synchronous environment, in a case that a CSI-RS of a certain SCS is measured, it may be expected that there are no scheduling restrictions of data of the same SCS. In other words, in a case that SCSs are the same between the CSI-RS and the SCS of data, the UE may transmit and/or receive the data during the CSI-RS measurement.

The UE may support simultaneous transmission and/or reception of data and a CSI-RS of different numerology, and having such capability may be reported to the base station by the UE capability information. In a case of supporting simultaneous transmission and/or reception capability of data and an SSB of different numerology (for example, simultaneousRxDataSSB-DiffNumerology), the UE may expect to support simultaneous transmission and/or reception of data and a CSI-RS of different numerology.

The UE may support simultaneous transmission and/or reception capability of data and a CSI-RS of different numerologies as another capability of simultaneous transmission and/or reception capability of data and an SSB of different numerologies (for example, simultaneousRxDataSSB-DiffNumerology). In other words, the UE capability information indicating the simultaneous transmission and/or reception capability of data and a CSI-RS of different numerology may be defined separately from the UE capability information indicating the simultaneous transmission and/or reception capability of data and an SSB of different numerology.

The UE which has capability of simultaneous transmission and/or reception of a CSI-RS and data with different SCSs may expect that there are no scheduling restrictions of data. In other words, even in a case that SCSs of the CSI-RS and data are different from each other, the UE may transmit and/or receive the data during the CSI-RS measurement.

The UE which does not have capability of simultaneous transmission and/or reception of a CSI-RS and data with different SCSs may follow the following scheduling restrictions: it is not expected to perform transmission and/or reception of data with an SCS different from an SCS of the CSI-RS during the CSI-RS measurement (or the UE cannot perform data transmission and/or reception). Note that, operations in synchronous environment and non-synchronous environment will be described below.

Note that capability of the simultaneous transmission and/or reception of data and a CSI-RS of different numerologies does not need to be defined. In this case, (all) UE may expect that simultaneous transmission and/or reception of a CSI-RS and data with different SCSs is possible, or may expect not possible. The expectation may be defined in the specification.

In FR2, also in the case of CSI-RS measurement, it is expected directing a received beam to a neighbour cell similarly to the SSB measurement. Thus, with respect to the case of performing the CSI-RS measurement of FR2, the UE is not expected to perform data transmission and/reception in a CSI-RS symbol to measure and 1 symbol before and after the CSI-RS symbol (or the UE cannot perform data transmission and/or reception).

Note that in a case that intra-band CA is performed in FR2, scheduling restrictions may be applied to all serving cells of the band. In a case that inter-band CA is performed in FR2, scheduling restrictions may be applied to all serving cells of the inter-band (both bands). In other words, in a case that intra-band CA or inter-band CA is performed in FR2, it may not be expected to perform data transmission and/or reception in a CSI-RS symbol in all serving cells and 1 symbol before and after the CSI-RS symbol.

<Synchronous Environment>

In a case of being able to expect synchronous environment in FR1, in a CSI-RS symbol and 1 symbol before and after the CSI-RS symbol, the UE may not expect to perform transmission and/or reception of data that is different from the CSI-RS in the SCS.

In a case that intra-band CA is performed in FR1 and in a case of being able to expect synchronous environment in FR1, the UE may expect scheduling restrictions are applied to all serving cells of the band.

In a case that inter-band CA is performed in FR1 and in a case of being able to expect synchronous environment in FR1, the UE may expect there are no scheduling restrictions, or may expect that scheduling restrictions are applied to all serving cells of the band.

Note that the UE may expect synchronous environment unless an associated SSB is configured to all measurement target CSI-RSs.

In other words, in a case that there is a CSI-RS where even one associated SSB is not configured in the configured CSI-RSs, the UE may expect synchronous environment. In a case that an associated SSB is configured for all of the configured CSI-RSs, the UE may expect non-synchronous environment.

The UE may be configured with one associated SSB for each CSI-RS resource. The associated SSB may be or may not be in a relation of quasi-co-location (QCL) with the CSI-RS resource.

The UE may determine whether or not to be able to expect synchronous environment in the CSI-RS measurement, based on information (for example, useServingCellTimingForSync, other information elements, parameters, and the like) except the above-described associated SSB. For example, the UE may expect synchronous environment in a case that useServingCellTimingForSync is enabled. For example, the UE may expect synchronous environment in a case that the measurement target frequency is in a TDD band.

Figure 2:
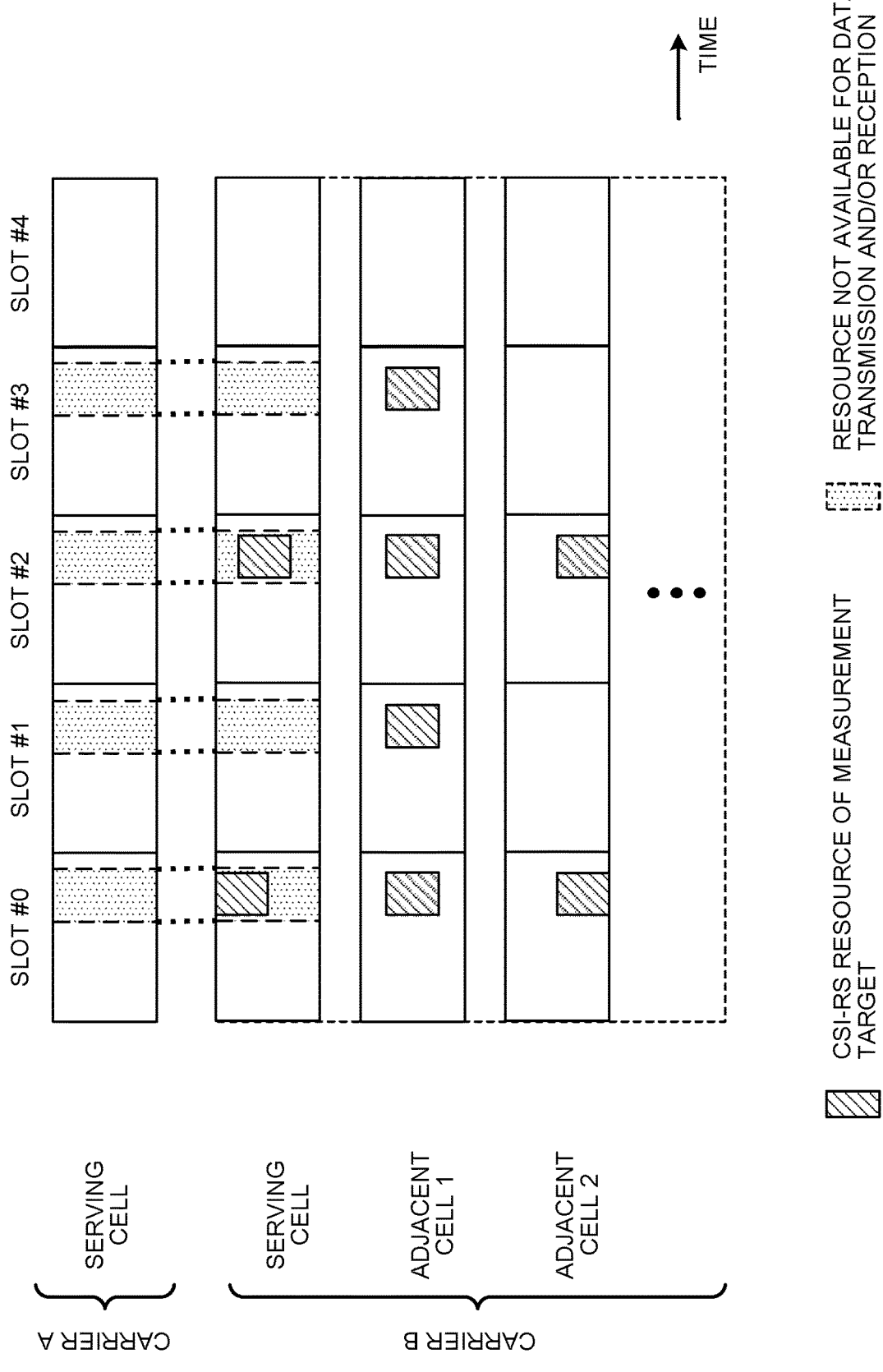
FIG. 2 is a diagram to show another example of scheduling restrictions in a case that synchronous environment can be expected.

FIG. 1 is a diagram to show an example of scheduling restrictions in a case that synchronous environment can be expected. FIG. 2 is a diagram to show another example of scheduling restrictions in a case that synchronous environment can be expected. FIG. 1 corresponds to the case that the UE is not configured with CA (one serving cell is configured), and FIG. 2 corresponds to the case that the UE is configured with CA (two serving cells are configured).

In FIG. 1, a CSI-RS of the measurement target is transmitted in a measurement target carrier (serving cell, adjacent cell 1, and adjacent cell 2). The serving cell and adjacent cell 2 include CSI-RS resources in slot #0 and slot #3. Adjacent cell 1 includes CSI-RS resources slots #0 to #3. The UE is configured with a measurement using these CSI-RSs. These cells are synchronized.

In a case of being able to expect synchronous environment like FIG. 1, in a configured CSI-RS symbol and 1 symbol before and after the CSI-RS symbol, the UE may not expect to perform transmission and/or reception of data that is different from the CSI-RS in the SCS. The "resources not available for data transmission and/or reception" illustrated in the drawing correspond to resources that the UE expected there are scheduling restrictions of data. Note that, with respect to other resources, the UE may expect that there are no scheduling restrictions.

In FIG. 2, a CSI-RS of the measurement target is transmitted in a carrier B. The configurations of CSI-RSs of the serving cell, adjacent cell 1, and adjacent cell 2 of the carrier B are similar to the configurations in FIG. 1. A carrier A and the carrier B are synchronized with each other.

In a case of being able to expect synchronous environment like FIG. 2, in a CSI-RS symbol to measure in a certain carrier (carrier B) and 1 symbol before and after the CSI-RS symbol, in not only the same carrier (carrier B) but also another carrier (carrier A), the UE may not expect to perform transmission and/or reception of data that is different from the CSI-RS in the SCS.

Note that examples that symbol positions of CSI-RS resources in each cell are the same (aligned) are illustrated in FIGS. 1 and 2, but the present disclosure is not limited to this. The configuration of the slot, the number of CSI-RSs, and the like are not limited to this example. In a CSI-RS symbol in at least one cell where the CSI-RS measurement is configured and 1 symbol before and after the CSI-RS symbol, the UE may not expect to perform transmission and/or reception of data that is different from the CSI-RS in the SCS.

<Non-Synchronous Environment>

In a case of not being able to expect synchronous environment in FR1, the UE may measure, in a measurement gap (MG), a CSI-RS different from data in an SCS in the serving cell. The UE may not expect to perform transmission and/or reception of data in the serving cell in the MG (cannot perform transmission and/or reception).

In this case, the UE carries out a measurement by using CSI-RS resources included within the MG period, and may not measure in CSI-RS resources out of the MG period. Out of the MG period, the UE may transmit and/or receive data with an SCS that is different from the SCS of the CSI-RS to measure during the MG period.

In a case of not being able to expect synchronous environment in FR1, the UE may measure a CSI-RS during a configured certain period, and in the certain period, may not expect transmitting and/or receiving data that is different from the above-described CSI-RS in the SCS. The certain period may be configured to the UE, for example, by higher layer signaling. Note that the UE may not expect transmitting and/or receiving data with the same SCS as that of the above-described CSI-RS in the certain period.

Here, the certain period may be an SMTC window. In other words, even in a case that the UE is not configured with the SSB measurement but configured with the CSI-RS measurement, an SMTC window may be configured. In this case, the UE may perform the CSI-RS measurement by using the CSI-RS included within the SMTC window. The UE may not measure CSI-RS resources out of the SMTC window.

The above-described certain period may be a window for the CSI-RS measurement. The window may be a window defined separately from the SMTC window. When configured with the window for the CSI-RS measurement, for example, by using higher layer signaling, the UE may carry out the CSI-RS measurement by using a CSI-RS included within the window. The UE may not measure CSI-RS resources out of the window.

In a case that the UE is configured with a CSI-RS where an associated SSB is configured, the above-described certain period may be configured to the UE by all means.

Figure 3:
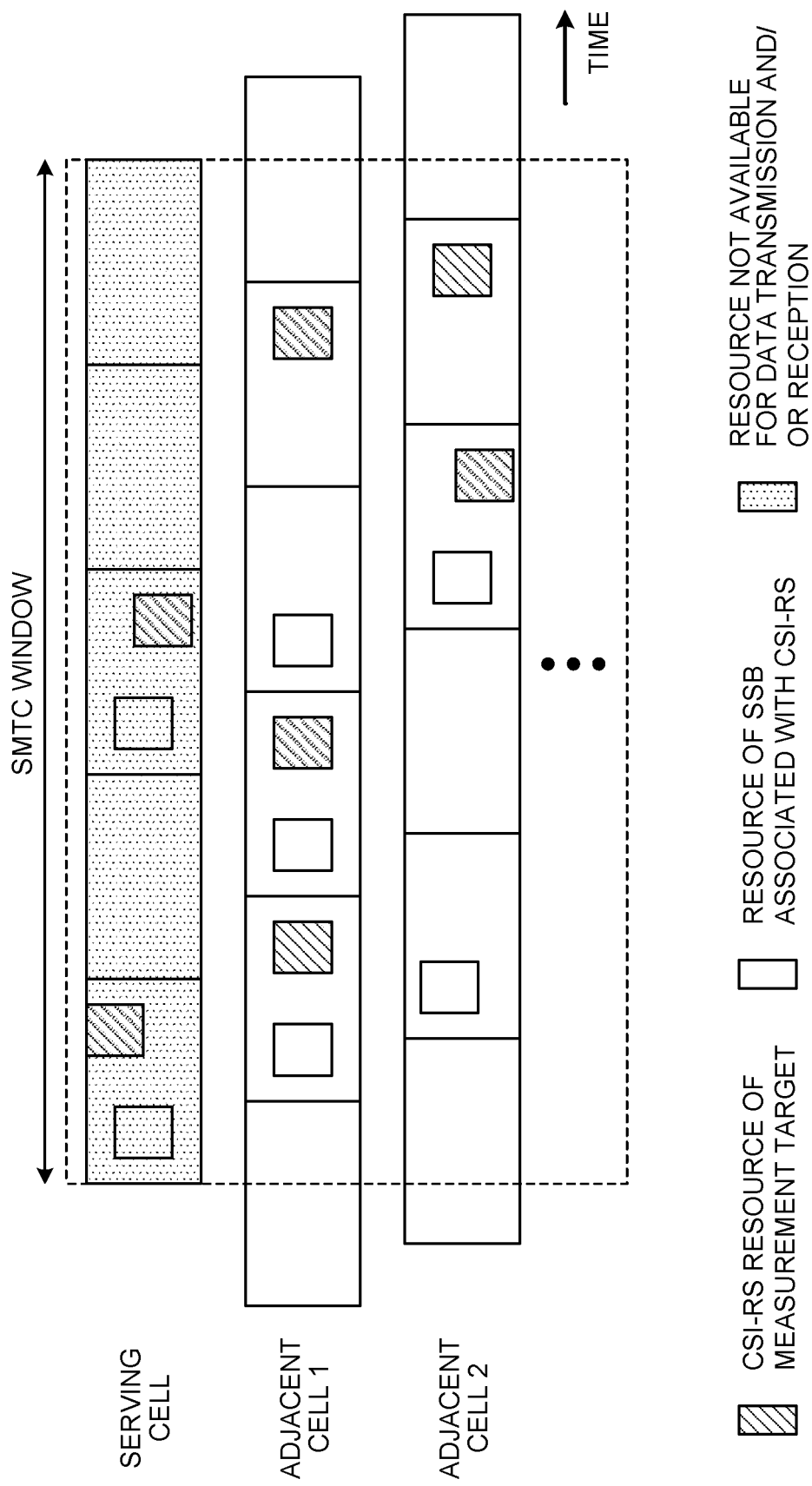
FIG. 3 is a diagram to show an example of scheduling restrictions in a case that synchronous environment cannot be expected.
Figure 4:
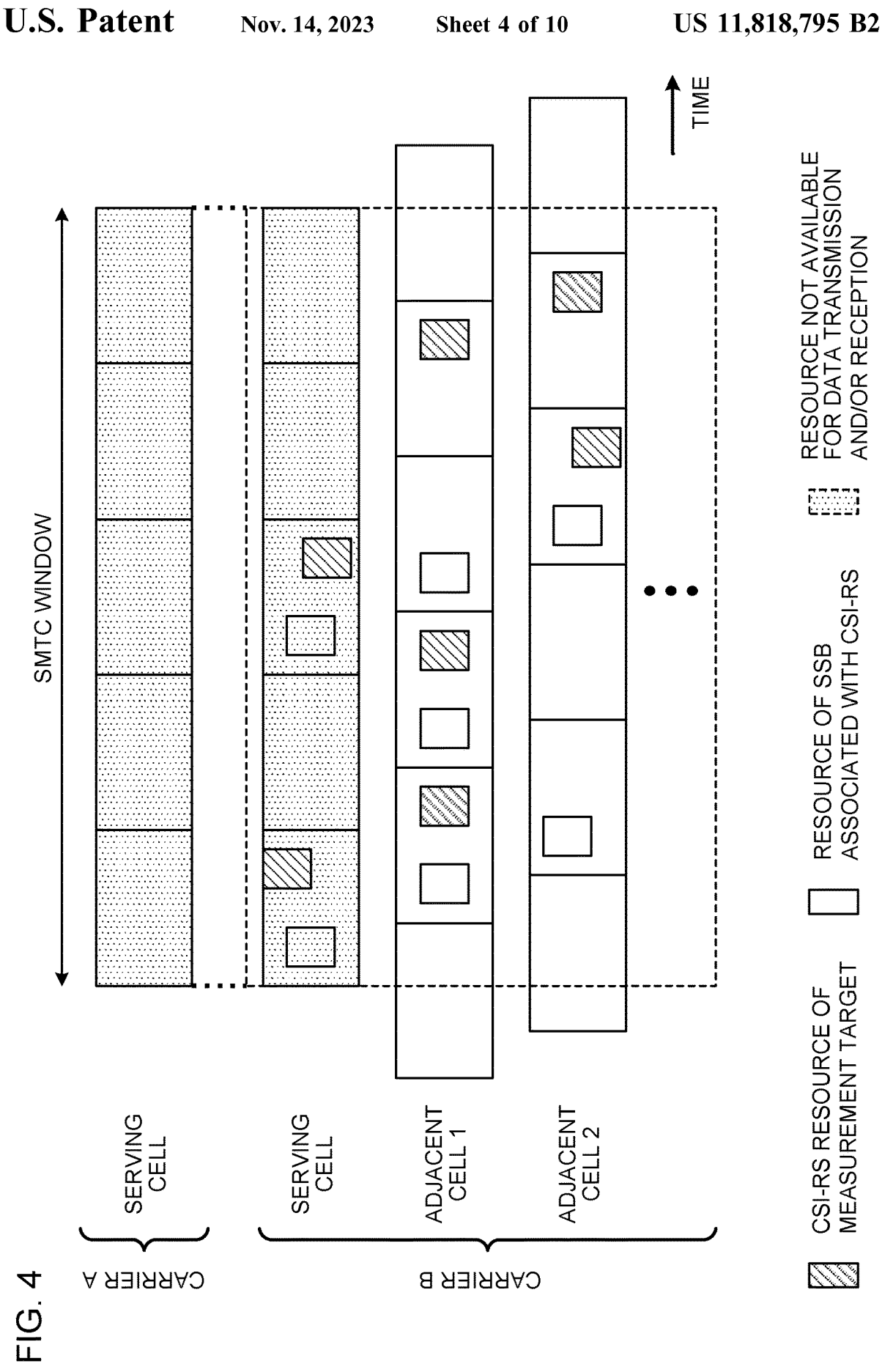
FIG. 4 is a diagram to show another example of scheduling restrictions in a case that synchronous environment cannot be expected.

FIG. 3 is a diagram to show an example of scheduling restrictions in a case that synchronous environment cannot be expected. FIG. 4 is a diagram to show another example of scheduling restrictions in a case that synchronous environment cannot be expected. FIG. 3 corresponds to the case that the UE is not configured with CA (one serving cell is configured), and FIG. 4 corresponds to the case that the UE is configured with CA (two serving cells are configured).

In FIG. 3, a CSI-RS of the measurement target is transmitted in a measurement target carrier (serving cell, adjacent cell 1, and adjacent cell 2). The UE is configured with a measurement using these CSI-RSs. These cells are non-synchronous.

FIGS. 3 and 4 measure a CSI-RS in the above-mentioned configured SMTC window, and in the SMTC window, corresponds to the case which does not expect transmitting and/or receiving data that is different from the above-described CSI-RS in the SCS.

Resources of an SSB associated with each CSI-RS is also shown in FIGS. 3 and 4. Note that the CSI-RS and the SSB associated with the CSI-RS may be included in the same slot, or may be included in different slots from each other.

In a case of not being able to expect the synchronization state like FIG. 3, an arbitrary symbol may be used for the CSI-RS measurement in the window period, and hence the UE may not expect transmitting and/or receiving data in the window period.

In FIG. 4, a CSI-RS of the measurement target is transmitted in the carrier B. The configurations of CSI-RSs of the serving cell, adjacent cell 1, and adjacent cell 2 of the carrier B are similar to the configurations in FIG. 1. This example illustrates an example that the frame timings of the serving cell of the carrier A and the serving cell of the carrier B are aligned, but frame timings do not need to be aligned.

In a case of not being able to expect the synchronization environment like FIG. 4, an arbitrary symbol may be used for the CSI-RS measurement in the above-described window period configured in a certain carrier (carrier B), and hence the UE may not expect transmitting and/or receiving data in the window period.

According to the first embodiment described above, the UE can appropriately expect scheduling restrictions of data transmission and/or reception at the time of the CSI-RS measurement.

Second Embodiment

A second embodiment relates to data transmission and/or reception at the time of an RLM-RS measurement.

At first, data transmission and/or reception operation on an RLM reference signal (RLM-RS) symbol in a PCell (primary cell)/PSCell (primary secondary cell) frequency (frequency including at least one of the PCell and the PSCell) will be described.

<<FR1>>

In FR1, in a case that the SCSs of an RLM reference signal and data are the same, the UE may expect that there are no scheduling restrictions. In other words, the UE may transmit and/or receive the data during radio link monitoring in a case that SCSs are the same between the RLM reference signal and data. Note that "during radio link monitoring" in the present disclosure may be interchangeably interpreted with "on an RLM-RS symbol," "on an RLM-RS symbol and 1 symbol before and after the RLM-RS symbol," and the like.

Meanwhile, in FR1, in a case that SCSs of the RLM reference signal and data are different from each other, the UE may follow, for example, the following scheduling restrictions (Alt. 1 to Alt. 3 including no scheduling restrictions).

(Alt. 1) The UE is not expected transmitting and/or receiving the RLM reference signal and data at the same time (transmission and/or reception is not available). In a case that SCSs of the RLM reference signal and data are different from each other, the UE may not expect transmitting and/or receiving of the data during radio link monitoring. Such scheduling restrictions may be applied to all UEs communicating in the same PCell/PSCell frequency as the UE.

(Alt. 2) The UE may follow scheduling restrictions using UE capability.

For example, in the RRM measurement based the SSB, simultaneous transmission and/or reception capability (simultaneousRxDataSSB-DiffNumerology) of data and the SSB of different numerology is defined. In a case that the RLM reference signal (RLM-RS) is an SSB, the above-described UE capability (simultaneousRxDataSSB-DiffNumerology) may be reused. Even if SCSs of the RLM reference signal and the data are different from each other, the UE having the UE capability may transmit and/or receive data during radio link monitoring. In a case that SCSs of the RLM reference signal and the data are different from each other, the UE which does not have the UE capability may expect that simultaneous transmission and/or reception (transmission and/or reception of the data) is not available.

Note that also in a case that the RLM reference signal is a CSI-RS, the above-described UE capability may be reused. Alternatively, new UE capability indicating UE capability able to perform transmission and/or reception of data during radio link monitoring even if the SCSs of the RLM reference signal and the data are different from each other may be defined. In a case of having the new UE capability, even if the SCSs of the RLM reference signal and the data are different from each other, the UE may expect to be able to perform transmission and/or reception of data during radio link monitoring.

In a case that the RLM reference signal is a particular reference signal (for example, CSI-RS), the UE may expect that simultaneous transmission and/or reception (transmission and/or reception of the data) is not available (in other words, may not support transmitting and receiving data with an SCS that is different from the RLM reference signal at the same time).

(Alt. 3) The UE may expect that there are no scheduling restrictions. In other words, the UE may expect that simultaneous transmission and/or reception of the RLM reference signal and the data that are different in the SCS (transmission and/or reception of the data) is possible. Such scheduling restrictions can be applied in a case of treating the RLM as a special case.

<<FR2>>

In FR2, the following scheduling restrictions are conceivable from the viewpoint of analog BF.

In FR2, in a case that SCSs of the RLM reference signal and data are the same, the UE may follow, for example, the following scheduling restrictions (Alt. a to Alt. c including no scheduling restrictions). Note that due to directing analog reception BF to a neighbour cell in the RRM measurement based the SSB, the UE is disabled in simultaneous reception.

(Alt. a) The UE expects that simultaneous transmission and/or reception of the RLM-RS and data is not available regardless of other conditions (by all means). For example, according to this expectation, a situation that a beam same as the beam to transmit and/or receive data may not be used for the RLM can be supported similarly to a case of the RRM measurement based on the SSB.

(Alt. b) The UE expects that simultaneous reception of the RLM-RS and data is possible depending on other conditions (e.g., on an RLM-RS symbol which is in quasi-co-location (QCL) with a PDCCH, and the like). For example, in a case of monitoring only an RS that is in QCL with a state (TCI-state) (a beam of a PDCCH) of an active transmission configuration indication (TCI) as the RLM-RS (for example, in a case that the RLM-RS is not explicitly specified), since it is conceivable that RLM is performed with analog BF used for data transmission and/or reception, the UE may assume that simultaneous transmission and/or reception of the RLM-RS and the data is possible.

Note that the UE may control receiving processes (for example, at least one of de-mapping, demodulation, and decoding) of a channel, based on information (QCL information) about QCL of the channel (for example, PDCCH, PDSCH). Here, QCL is an indicator indicating the statistical property of the channel. For example, a certain signal and another signal being in a relation of QCL may mean that it can be assumed that at least one of doppler shift, doppler spread, average delay, delay spread, Spatial parameter (for example, Spatial Rx Parameter) is the same (in QCL with respect to at least one of these) among these plurality of different signals.

Note that spatial reception parameters may correspond to a received beam (for example, a received analog beam) of the UE, and a beam may be specified based on spatial QCL. QCL in the present disclosure and at least one element of QCL may be interchangeably interpreted with sQCL (spatial QCL).

The TCI state may indicate (may include) QCL information.

For example, the TCI state (and/or QCL information) may be information about QCL of a target channel (or reference signal (RS) for the channel) and another signal (for example, another downlink reference signal (DL-RS)).

(Alt. c) The UE expects that simultaneous transmission and/or reception of the RLM-RS and data is possible regardless of other conditions (by all means). In other words, the UE expects that there are no scheduling restrictions. According to this expectation, a situation that RLM is performed only with the same beam as the beam of analog BF used for data can be supported.

Meanwhile, in FR2, in a case that the SCSs of the RLM reference signal and the data are different from each other, the UE may follow scheduling restrictions, based on one of the above-described Alt. 1 to Alt. 3 and Alt. a to Alt. c or an arbitrary combination thereof. In a case that the analog BF is common in the data and the RLM, this influences whether simultaneous transmission and/or reception of the data and the RLM-RS that are different in the SCS is possible or not, so such situation can be supported.

Note that Alt. 1 to Alt. 3 may be scheduling restrictions except Alt. 1 to Alt. 3 in a case of SCSs being different from each other in FR1. Alt. a to Alt. c may be scheduling restrictions except Alt. a to Alt. c in a case of SCSs being the same in FR2.

<Scheduling Restrictions of SCell in Intra-Band CA, and Inter-Band CA>

Next, scheduling restrictions on the SCell in intra-band CA or inter-band CA will be described.

<<Case of Intra-Band CA in FR1>>

In a case that intra-band CA is performed in FR1, the UE may follow the following restrictions (scheduling restrictions) about the transmission and/or reception of data on an SCell serving cell.

(Alt. 1) The UE may follow the same scheduling restrictions as on the PCell/PSCell of FR1. Note that the (Alt. 1) corresponds to the scheduling restrictions during the RRM measurement based on the SSB, so there is affinity with the SSB measurement.

(Alt. 2) The UE may expect that there are no scheduling restrictions. In other words, in a case that intra-band CA is performed in FR1, the UE may perform transmission and/or reception of data during radio link monitoring on the SCell serving cell.

<<Case of Inter-Band CA in FR1>>

In a case that inter-band CA is performed in FR1, the UE may follow the following restrictions (scheduling restrictions) about the transmission and/or reception of data on the SCell serving cell.

(Alt. 1) The UE may follow the same scheduling restrictions as on the PCell/PSCell of FR1.

(Alt. 2) The UE may expect that there are no scheduling restrictions. In other words, in a case that inter-band CA is performed in FR1, the UE may perform transmission and/or reception of data during radio link monitoring on the SCell serving cell. Note that the (Alt. 2) corresponds to the scheduling restrictions during the RRM measurement based on the SSB, so there is affinity with the SSB measurement.

<<Case of Intra-Band CA in FR2>>

In a case that intra-band CA is performed in FR2, the UE may follow the following restrictions (scheduling restrictions) about the transmission and/or reception of data on an SCell serving cell.

(Alt. 1) The UE may follow the same scheduling restrictions as on the PCell/PSCell of FR2. Note that the (Alt. 1) corresponds to the scheduling restrictions during the RRM measurement based on the SSB, so there is affinity with the SSB measurement.

(Alt. 2) The UE may expect that there are no scheduling restrictions. In other words, in a case that intra-band CA is performed in FR2, the UE may perform transmission and/or reception of data during radio link monitoring on the SCell serving cell.

<<Case of Inter-Band CA in FR2>>

In a case that inter-band CA is performed in FR2, the UE may follow the following restrictions (scheduling restrictions) about the transmission and/or reception of data on the SCell serving cell.

(Alt. 1) The UE may follow the same scheduling restrictions as on the PCell/PSCell of FR2. Note that the (Alt. 1) corresponds to the scheduling restrictions during the RRM measurement based on the SSB, so there is affinity with the SSB measurement.

(Alt. 2) The UE may expect that there are no scheduling restrictions. In other words, in a case that inter-band CA is performed in FR2, the UE may perform transmission and/or reception of data during radio link monitoring on the SCell serving cell.

<<Case of Inter-Band CA Between FR1 and FR2>>

In a case that inter-band CA is performed between FR1 and FR2, the UE may expect that there are no scheduling restrictions on the SCell serving cell. In other words, in a case that inter-band CA is performed between FR1 and FR2, the UE may perform transmission and/or reception of data during radio link monitoring on the SCell serving cell.

Next, some examples about scheduling restrictions in the above-mentioned various cases will be describes in greater detail.

<About Case that RLM Reference Signal (RLM-RS) is SS Block and Case that RLM Reference Signal (RLM-RS) is CSI-RS>

Different scheduling restrictions may be defined depending on a type (kind) of the RLM reference signal (RLM-RS) (for example, in the case of the SS block, and in the case of the CSI-RS). The type of the reference signal may mean that the reference signal is either of an SSB, a CSI-RS, a PSS, an SSS, a DMRS, an MRS, a beam specific signal, and the like.

The UE may determine availability of simultaneous transmission and/or reception of the RLM-RS and data, based on the first scheduling restriction, in a case that the SSB is configured as the RLM-RS, or may determine the availability, based on the second scheduling restriction, in a case that the CSI-RS is configured as the RLM-RS.

For example, in FR1, in a case that the SCSs of the RLM reference signal and the data are different from each other and that the RLM reference signal is an SS block, availability of simultaneous transmission and/or reception may be determined depending on whether or not to have certain UE capability (for example, UE capability (simultaneousRx-DataSSB-DiffNumerology) for RRM, and the like).

In FR1, in a case that the RLM reference signal is a CSI-RS, it is expected that the UE capability to prescribe measurement based on a CSI-RS (UE capability of RRM based on the CSI-RS) is not always available. Therefore, in a case that the RLM reference signal is a CSI-RS, the UE may expect that simultaneous transmission and/or reception of the RLM-RS and the data is not available regardless of whether the UE has UE capability for RRM or not.

<Control of Scheduling Restrictions in RLM and RRM>

It is conceivable that the scheduling restrictions in RLM is more moderate than the scheduling restrictions in the RRM measurement based on the SS block or the CSI-RS (SSB-based/CSI-RS-based RRM measurement). The RRM measurement based on the SSB may be simply referred to as an "SSB measurement," and the RRM measurement based on the CSI-RS may be simply referred to as an "CSI-RS measurement." In the present disclosure, an RS used for the RRM measurement may be referred to as an "RRM-RS."

In a case of being configured to use a reference signal of the same type for both the RRM measurement and the RLM measurement, the UE may apply different data transmission and/or reception controls (may expect different scheduling restrictions) for the measurement timing of the RRM-RS and the measurement timing of the RLM-RS.

Here, to use a reference signal of the same type for both the RRM measurement and the RLM measurement, for example, may mean that both the RRM-RS and the RLM-RS are configured to be an SSB, or may mean that both the RRM-RS and the RLM-RS are configured to be a CSI-RS.

(Example 1) In the case of FR2, it is expected to direct analog BF to a neighbour cell during the RRM measurement based on the SS block or the CSI-RS, and hence the UE expects that data transmission and/or reception which is simultaneous with the RRM measurement is not available. Meanwhile, it may be expected that data transmission and/or reception which is simultaneous with RLM is possible depending on the condition during the RLM (such as when monitoring an RLM reference signal which is in QCL with the active TCI state).

(Example 2) In synchronous environment of FR1 and/or FR2, an arrival timing of the reference signal of the neighbour cell during the RRM measurement has time lag with the frame timing of the serving cell according to a propagation delay difference (+ synchronization error between base stations). Thus, the UE expects that data transmission and/or reception is not available for a symbol of the reference signal (SSB, CSI-RS, and the like) for the RRM and 1 symbol before and after the symbol. Meanwhile, in the RLM, the UE may expect that data simultaneous transmission and/or reception is not available only on the symbol of the RLM reference signal. This is because, in the RLM, not monitoring a signal of a neighbour cell but monitoring only the signal of the own cell, and hence a margin of one or more symbols before and after is not necessary.

According to the second embodiment described above, the UE can appropriately expect scheduling restrictions of data transmission and/or reception at the time of the RLM-RS measurement.

Third Embodiment

A third embodiment relates to data transmission and/or reception at the time of an L1 measurement.

At first, data transmission and/or reception operation on an L1 measurement reference signal (L1-RS) symbol in a PCell (primary cell)/PSCell (primary secondary cell) frequency (frequency including at least one of the PCell and the PSCell) will be described.

Note that an L1-RSRP measurement (measurement for reference signal received power (RSRP) and beam failure detection in the physical layer may be referred to as "L1 measurement" since it is a measurement of the physical layer. The L1 measurement reference signal (which may be referred to as "L1-RS," "L1 measurement RS," and the like) of the present disclosure may be interchangeably interpreted with at least one of an L1-RSRP reference signal and a beam failure detection reference signal.

<<FR1>>

In FR1, in a case that the SCSs of L1 measurement reference signal and data are the same, the UE may expect that there are no scheduling restrictions. In other words, the UE may transmit and/or receive the data during the L1 measurement in a case that SCSs are the same between the L1 measurement reference signal and data. Note that "during L1 measurement" in the present disclosure may be interchangeably interpreted with "on an L1-RS symbol," "on an L1-RS symbol and 1 symbol before and after the L1-RS symbol," and the like.

Meanwhile, in FR1, in a case that SCSs of the L1 measurement reference signal and data are different from each other, the UE may follow, for example, the following scheduling restrictions (Alt. 1 to Alt. 3 including no scheduling restrictions).

(Alt. 1) The UE is not expected transmitting and/or receiving the L1 measurement reference signal and data at the same time (transmission and/or reception is not available). In a case that SCSs of the L1 measurement reference signal and data are different from each other, the UE may not expect transmitting and/or receiving of the data during the L1 measurement. Such scheduling restrictions may be applied to all UEs communicating in the same PCell/PSCell frequency as the UE.

(Alt. 2) The UE may follow scheduling restrictions using UE capability.

For example, in the RRM measurement based the SSB, simultaneous transmission and/or reception capability (simultaneousRxDataSSB-DiffNumerology) of data and the SSB of different numerology is defined. In a case that the L1 measurement reference signal (L1-RS) is an SSB, the above-described UE capability (simultaneousRxDataSSB-DiffNumerology) may be reused. Even if SCSs of the L1 measurement reference signal and the data are different from each other, the UE having the UE capability may transmit and/or receive data during the L1 measurement. In a case that SCSs of the L1 measurement reference signal and the data are different from each other, the UE which does not have the UE capability may expect that simultaneous transmission and/or reception (transmission and/or reception of the data) is not available (may not expect transmitting and receiving at the same time).

Note that also in a case that the L1 measurement reference signal is a CSI-RS, the above-described UE capability may be reused. Alternatively, new UE capability indicating UE capability able to perform transmission and/or reception of data during the L1 measurement not to expect transmitting and/or receiving at the same time even if the SCSs of the L1 measurement reference signal and the date are different may be defined. In a case of having the new UE capability, even if the SCSs of the L1 measurement reference signal and the data are different from each other, the UE may expect to able to perform transmission and/or reception of data during the L1 measurement.

In a case that the L1 measurement reference signal is a particular reference signal (for example, CSI-RS), the UE may expect that simultaneous transmission and/or reception (transmission and/or reception of the data) is not available (in other words, may not support transmitting and receiving data with an SCS that is different from the L1 measurement reference signal at the same time).

(Alt. 3) The UE may expect that there are no scheduling restrictions. In other words, the UE may expect that simultaneous transmission and/or reception of the L1 measurement reference signal and the data that are different in the SCS (transmission and/or reception of the data) is possible. Such scheduling restrictions can be applied in a case of treating the L1 measurement as a special case.

<<FR2>>

In FR2, the following scheduling restrictions are considered from the viewpoint of analog BF.

In FR2, in a case that SCSs of the L1 measurement reference signal and data are the same, the UE may follow, for example, the following scheduling restrictions (Alt. a to Alt. c including no scheduling restrictions). Note that due to directing analog reception BF to a neighbour cell in the RRM measurement based the SSB, the UE is disabled in simultaneous reception.

(Alt. a) The UE expects that simultaneous transmission and/or reception of the L1-RS and data is not available regardless of other conditions (by all means).

(Alt. b) The UE expects that simultaneous reception of the L1-RS and the data is possible, depending on other conditions (e.g., on the L1-RS symbol that is in QCL with the PDCCH, and the like). For example, in a case of monitoring only the RS that is in QCL with the active TCI state (beam of PDCCH) as the L1-RS (for example, in a case of not explicitly specifying the L1-RS), the UE may expect that simultaneous transmission and/or reception of the L1-RS and the data is possible.

(Alt. c) The UE expects that simultaneous transmission and/or reception of L1-RS and data is possible regardless of other conditions (by all means). In other words, the UE expects that there are no scheduling restrictions. It is conceivable that only the beam of the serving cell is the measurement target during the L1 measurement, and hence, according to this expectation, a situation that the L1 measurement is performed only with the same beam as the beam of analog BF used for data can be supported.

Note that the above-mentioned (Alt. 1 to Alt. 3), (Alt. a to Alt. c), and the like may use different expectations in the L1-RSRP measurement and the beam failure detection. For example, the UE may follow the scheduling restrictions of (Alt. a) in the L1-RSRP measurement, and may follow the scheduling restrictions of (Alt. c) in the beam failure detection.

Meanwhile, in FR2, in a case that the SCSs of the L1 measurement reference signal and the data are different from each other, the UE may follow scheduling restrictions, based on one of the above-described Alt. 1 to Alt. 3 and Alt. a to Alt. c or an arbitrary combination thereof. In a case that the analog BF is common in the data and the L1 measurement, this influences whether simultaneous transmission and/or reception of the data and the L1-RS that are different in the SCS is possible or not, so such situation can be supported.

Note that Alt. 1 to Alt. 3 may be scheduling restrictions except Alt. 1 to Alt. 3 in a case of SCSs being different from each other in FR1. Alt. a to Alt. c may be scheduling restrictions except Alt. a to Alt. c in a case of SCSs being the same in FR2.

<Scheduling Restrictions of Serving Cell in Intra-Band CA and Inter-Band CA>

Next, scheduling restrictions on the serving cell in intra-band CA or inter-band CA will be described.

<<Case of Intra-Band CA in FR1>>

In a case that intra-band CA is performed in FR1, the UE may follow the following restrictions (scheduling restrictions) about the transmission and/or reception of data on the serving cell.

(Alt. 1) The UE may follow the same scheduling restrictions as on the serving cell measuring the L1 of FR1. Note that the (Alt. 1) corresponds to the scheduling restrictions during the RRM measurement based on the SSB, so there is affinity with the SSB measurement.

(Alt. 2) The UE may expect that there are no scheduling restrictions. In other words, in a case that intra-band CA is performed in FR1, the UE may perform transmission and/or reception of data on the serving cell during the L1 measurement on another serving cell.

<<Case of Inter-Band CA in FR1>>

In a case that inter-band CA is performed in FR1, the UE may follow the following restrictions (scheduling restrictions) about the transmission and/or reception of data on the serving cell.

(Alt. 1) The UE may follow the same scheduling restrictions as on the serving cell measuring the L1 of FR1.

(Alt. 2) The UE may expect that there are no scheduling restrictions. In other words, in a case that inter-band CA is performed in FR1, the UE may perform transmission and/or reception of data on the serving cell during the L1 measurement on a serving cell of another band. Note that the (Alt. 2) corresponds to the scheduling restrictions during the RRM measurement based on the SSB, so there is affinity with the SSB measurement.

<<Case of Intra-Band CA in FR2>>

In a case that intra-band CA is performed in FR2, the UE may follow the following restrictions (scheduling restrictions) about the transmission and/or reception of data on the serving cell.

(Alt. 1) The UE may follow the same scheduling restrictions as on the serving cell measuring the L1 of FR2. Note that the (Alt. 1) corresponds to the scheduling restrictions during the RRM measurement based on the SSB, so there is affinity with the SSB measurement.

(Alt. 2) The UE may expect that there are no scheduling restrictions. In other words, in a case that intra-band CA is performed in FR2, the UE may perform transmission and/or reception of data on the serving cell during the L1 measurement on another serving cell.

<<Case of Inter-Band CA in FR2>>

In a case that inter-band CA is performed in FR2, the UE may follow the following restrictions (scheduling restrictions) about the transmission and/or reception of data on the serving cell.

(Alt. 1) The UE may follow the same scheduling restrictions as on the serving cell measuring the L1 of FR2. Note that the (Alt. 1) corresponds to the scheduling restrictions during the RRM measurement based on the SSB, so there is affinity with the SSB measurement.

(Alt. 2) The UE may expect that there are no scheduling restrictions. In other words, in a case that inter-band CA is performed in FR2, the UE may perform transmission and/or reception of data on the serving cell during the L1 measurement on a serving cell of another band.

<<Case of Inter-Band CA between FR1 and FR2>>

In a case that inter-band CA is performed between FR1 and FR2, the UE may expect that there are no scheduling restrictions on the serving cell. In other words, in a case that inter-band CA is performed between FR1 and FR2, the UE may perform transmission and/or reception of data during the L1 measurement on FR2 serving cell, on FR1 serving cell. The UE may perform transmission and/or reception of data on FR2 serving cell during the L1 measurement on FR1 serving cell.

Next, some examples about scheduling restrictions in the above-mentioned various cases will be describes in greater detail.

<About Case that L1 Measurement Reference Signal (L1-RS) is SS Block and Case that L1 Measurement Reference Signal (L1-RS) is CSI-RS>

Different scheduling restrictions may be defined depending on the type (kind) of the L1 measurement reference signal (L1-RS) (for example, in the case of the SS block, and in the case of the CSI-RS). The UE may determine availability of simultaneous transmission and/or reception of L1-RS and data, based on the first scheduling restriction, in a case that the SSB is configured as the L1-RS, or may determine the availability, based on the second scheduling restriction, in a case that the CSI-RS is configured as the L1-RS.

For example, in FR1, in a case that the SCSs of the L1 reference signal and the data are different from each other and that the L1 reference signal is an SS block, availability of simultaneous transmission and/or reception may be determined depending on whether or not to have certain UE capability (for example, UE capability (simultaneousRxDataSSB-DiffNumerology) for RRM, and the like).

In FR1, in a case that the L1 measurement reference signal is a CSI-RS, it is expected that the UE capability to prescribe measurement based on a CSI-RS (UE capability of RRM based on the CSI-RS) is not always available. Therefore, in a case that the L1 measurement reference signal is a CSI-RS, the UE may expect that simultaneous transmission and/or reception of the L1-RS and the data is not available regardless of whether the UE has UE capability for RRM or not.

<Control of Scheduling Restrictions in L1 Measurement and RRM>

It is conceivable that the scheduling restrictions in the L1 measurement is made more moderate than the scheduling restrictions in the RRM measurement based on the SS block or the CSI-RS (SSB-based/CSI-RS-based RRM measurement). The RRM measurement based on the SSB may be simply referred to as an "SSB measurement," and the RRM measurement based on the CSI-RS may be simply referred to as an "CSI-RS measurement."

In a case of being configured to use a reference signal of the same type for both the RRM measurement and the L1 measurement, the UE may apply different data transmission and/or reception controls (may expect different scheduling restrictions) for the measurement timing of the RRM-RS and the measurement timing of the L1-RS.

Here, to use a reference signal of the same type for both the RRM measurement and the L1 measurement, for example, may mean that both the RRM-RS and the L1-RS are configured to be an SSB, or may mean that both the RRM-RS and the L1-RS are configured to be a CSI-RS.

In a case of being configured to use a reference signal of the same type for both the RLM measurement and the L1 measurement, the UE may apply different data transmission and/or reception controls (may expect different scheduling restrictions) for the measurement timing of the RLM-RS and the measurement timing of the L1-RS.

(Example 1) In the case of FR2, it is expected to direct analog BF to a neighbour cell during the RRM measurement based on the SS block or the CSI-RS, and hence the UE expects that data transmission and/or reception which is simultaneous with the RRM measurement is not available. Meanwhile, only the beam of the serving cell is the measurement target during the L1 measurement, and hence data transmission and/or reception which is simultaneous with the L1 measurement may be expected to be possible under at least a particular condition (for example, in a case of monitoring only the RS that is in QCL with the active TCI state (beam of PDCCH) as the L1-RS).

(Example 2) In synchronous environment of FR1 and/or FR2, an arrival timing of the reference signal of the neighbour cell during the RRM measurement has time lag with the frame timing of the serving cell according to a propagation delay difference (+ synchronization error between base stations). Thus, the UE expects that data transmission and/or reception is not available for a symbol of the reference signal (SSB, CSI-RS, and the like) for the RRM and 1 symbol before and after the symbol. Meanwhile, in the L1 measurement, the UE may expect that data simultaneous transmission and/or reception is not available only on the symbol of the L1 measurement reference signal. This is because, in the L1 measurement, not measuring a signal of a neighbour cell but measuring only the signal of the own cell, and hence a margin of one or more symbols before and after is not necessary.

According to the third embodiment described above, the UE can appropriately expect scheduling restrictions of data transmission and/or reception at the time of the L1 measurement.

<Variations>

In a case that at least two of the RRM measurement (for example, the SSB measurement, the CSI-RS measurement), the RLM-RS measurement, and the L1 measurement are performed in the same symbol, it may be expected that either one of scheduling restrictions of the data transmission and/or reception expected in the measurement carried out is preferentially applied (for example, the strictest scheduling restrictions are applied).

For example, in a case that the CSI-RS measurement and the RLM-RS measurement are performed in the same symbol, and that the data transmission and/or reception which is simultaneous with the CSI-RS measurement is expected to be not available, and that the data transmission and/or reception which is simultaneous with the RLM-RS measurement is expected to be possible, the UE may expect the data transmission and/or reception is not available in the symbol.

Note that, in the above-described embodiments, the configuration that one frequency range includes a plurality of carriers, and one carrier includes a plurality of cells is mainly expected and described, but in the present disclosure, a frequency range, a cell, a serving cell, a carrier, a band and a CC may be interchangeably interpreted with each other.

Note that, in the present disclosure, the "inter-frequency measurement" may be interchangeably interpreted with "handover," and in this case, the "measurement target" may be interchangeably interpreted with a "target."

(Radio Communication System)

Hereinafter, a structure of a radio communication system according to one embodiment of the present disclosure will be described. In this radio communication system, the radio communication method according to each embodiment of the present disclosure described above may be used alone or may be used in combination for communication.

Figure 5:
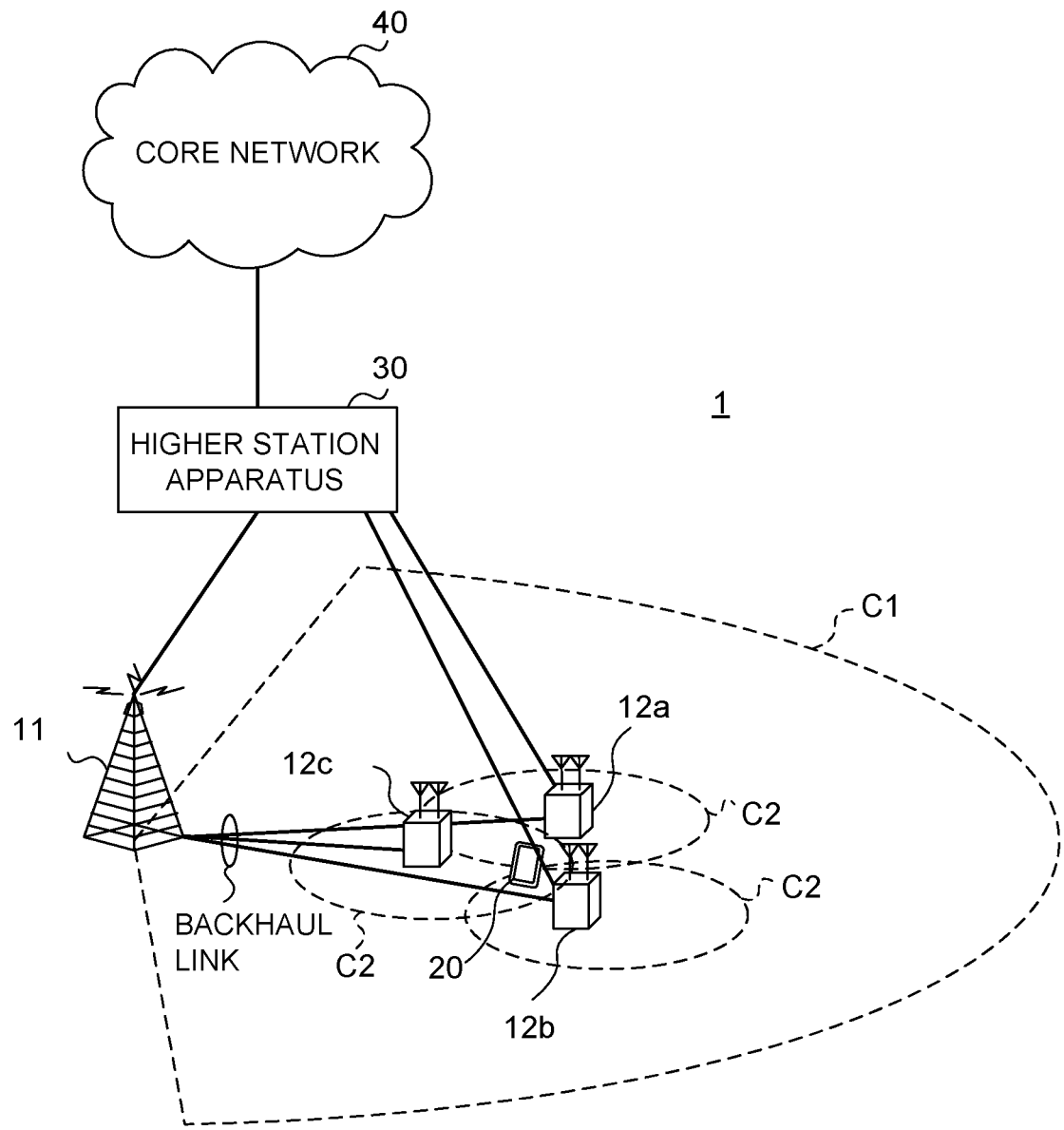
FIG. 5 is a diagram to show an example of a schematic structure of a radio communication system according to one embodiment.

FIG. 5 is a diagram to show an example of a schematic structure of the radio communication system according to one embodiment. A radio communication system 1 can adopt carrier aggregation (CA) and/or dual connectivity (DC) to group a plurality of fundamental frequency blocks (component carriers) into one, where the system bandwidth in an LTE system (for example, 20 MHz) constitutes one unit.

Note that the radio communication system 1 may be referred to as "LTE (Long Term Evolution)," "LTE-A (LTE-Advanced)," "LTE-B (LTE-Beyond)," "SUPER 3G," "IMT-Advanced," "4G (4th generation mobile communication system)," "5G (5th generation mobile communication system)," "NR (New Radio)," "FRA (Future Radio Access)," "New-RAT (Radio Access Technology)," and so on, or may be referred to as a system implementing these.

The radio communication system 1 includes a radio base station 11 that forms a macro cell C1 of a relatively wide coverage, and radio base stations 12 (12a to 12c) that form small cells C2, which are placed within the macro cell C1 and which are narrower than the macro cell C1. Also, user terminals 20 are placed in the macro cell C1 and in each small cell C2. The arrangement, the number, and the like of each cell and user terminal 20 are by no means limited to the aspect shown in the diagram.

The user terminals 20 can connect with both the radio base station 11 and the radio base stations 12. It is assumed that the user terminals 20 use the macro cell C1 and the small cells C2 at the same time by means of CA or DC. The user terminals 20 can execute CA or DC by using a plurality of cells (CCs).

Between the user terminals 20 and the radio base station 11, communication can be carried out by using a carrier of a relatively low frequency band (for example, 2 GHz) and a narrow bandwidth (referred to as, for example, an "existing carrier," a "legacy carrier" and so on). Meanwhile, between the user terminals 20 and the radio base stations 12, a carrier of a relatively high frequency band (for example, 3.5 GHz, 5 GHz, and so on) and a wide bandwidth may be used, or the same carrier as that used between the user terminals 20 and the radio base station 11 may be used. Note that the structure of the frequency band for use in each radio base station is by no means limited to these.

The user terminals 20 can perform communication by using time division duplex (TDD) and/or frequency division duplex (FDD) in each cell. Furthermore, in each cell (carrier), a single numerology may be employed, or a plurality of different numerologies may be employed.

Numerologies may be communication parameters applied to transmission and/or reception of a certain signal and/or channel, and for example, may indicate at least one of a subcarrier spacing, a bandwidth, a symbol length, a cyclic prefix length, a subframe length, a TTI length, the number of symbols per TTI, a radio frame structure, a particular filter processing performed by a transceiver in a frequency domain, a particular windowing processing performed by a transceiver in a time domain, and so on. For example, if certain physical channels use different subcarrier spacings of the OFDM symbols constituted and/or different numbers of the OFDM symbols, it may be referred to as that the numerologies are different.

A wired connection (for example, means in compliance with the CPRI (Common Public Radio Interface) such as an optical fiber, an X2 interface and so on) or a wireless connection may be established between the radio base station 11 and the radio base stations 12 (or between two radio base stations 12).

The radio base station 11 and the radio base stations 12 are each connected with a higher station apparatus 30, and are connected with a core network 40 via the higher station apparatus 30. Note that the higher station apparatus 30 may be, for example, access gateway apparatus, a radio network controller (RNC), a mobility management entity (MME) and so on, but is by no means limited to these. Also, each radio base station 12 may be connected with the higher station apparatus 30 via the radio base station 11.

Note that the radio base station 11 is a radio base station having a relatively wide coverage, and may be referred to as a "macro base station," a "central node," an "eNB (eNodeB)," a "transmitting/receiving point" and so on. The radio base stations 12 are radio base stations having local coverages, and may be referred to as "small base stations," "micro base stations," "pico base stations," "femto base stations," "HeNBs (Home eNodeBs)," "RRHs (Remote Radio Heads)," "transmitting/receiving points" and so on. Hereinafter, the radio base stations 11 and 12 will be collectively referred to as "radio base stations 10," unless specified otherwise.

Each of the user terminals 20 is a terminal that supports various communication schemes such as LTE and LTE-A, and may include not only mobile communication terminals (mobile stations) but stationary communication terminals (fixed stations).

In the radio communication system 1, as radio access schemes, orthogonal frequency division multiple access (OFDMA) is applied to the downlink, and single carrier frequency division multiple access (SC-FDMA) and/or OFDMA is applied to the uplink.

OFDMA is a multi-carrier communication scheme to perform communication by dividing a frequency band into a plurality of narrow frequency bands (subcarriers) and mapping data to each subcarrier. SC-FDMA is a single carrier communication scheme to mitigate interference between terminals by dividing the system bandwidth into bands formed with one or continuous resource blocks per terminal, and allowing a plurality of terminals to use mutually different bands. Note that the uplink and downlink radio access schemes are by no means limited to the combinations of these, and other radio access schemes may be used.

In the radio communication system 1, a downlink shared channel (PDSCH (Physical Downlink Shared Channel), which is used by each user terminal 20 on a shared basis, a broadcast channel (PBCH (Physical Broadcast Channel)), downlink L1/L2 control channels and so on, are used as downlink channels. User data, higher layer control information, SIBs (System Information Blocks) and so on are communicated on the PDSCH. The MIBs (Master Information Blocks) are communicated on the PBCH.

The downlink L1/L2 control channels include a PDCCH (Physical Downlink Control Channel), an EPDCCH (Enhanced Physical Downlink Control Channel), a PCFICH (Physical Control Format Indicator Channel), a PHICH (Physical Hybrid-ARQ Indicator Channel) and so on. Downlink control information (DCI), including PDSCH and/or PUSCH scheduling information, and so on are communicated on the PDCCH.

Note that, the DCI scheduling DL data reception may be referred to as "DL assignment," and the DCI scheduling UL data transmission may be referred to as "UL grant."

The number of OFDM symbols to use for the PDCCH is communicated on the PCFICH. Transmission confirmation information (for example, also referred to as "retransmission control information," "HARQ-ACK," "ACK/NACK," and so on) of HARQ (Hybrid Automatic Repeat reQuest) to a PUSCH is transmitted on the PHICH. The EPDCCH is frequency-division multiplexed with the PDSCH (downlink shared data channel) and used to communicate DCI and so on, like the PDCCH.

In the radio communication system 1, an uplink shared channel (PUSCH (Physical Uplink Shared Channel)), which is used by each user terminal 20 on a shared basis, an uplink control channel (PUCCH (Physical Uplink Control Channel)), a random access channel (PRACH (Physical Random Access Channel)) and so on are used as uplink channels. User data, higher layer control information and so on are communicated on the PUSCH. In addition, radio quality information (CQI (Channel Quality Indicator)) of the downlink, transmission confirmation information, scheduling request (SR), and so on are transmitted on the PUCCH. By means of the PRACH, random access preambles for establishing connections with cells are communicated.

In the radio communication system 1, a cell-specific reference signal (CRS), a channel state information-reference signal (CSI-RS), a demodulation reference signal (DMRS), a positioning reference signal (PRS), and so on are transmitted as downlink reference signals. In the radio communication system 1, a measurement reference signal (SRS (Sounding Reference Signal)), a demodulation reference signal (DMRS), and so on are transmitted as uplink reference signals. Note that DMRS may be referred to as a "user terminal specific reference signal (UE-specific Reference Signal)." Transmitted reference signals are by no means limited to these.

(Radio Base Station)

Figure 6:
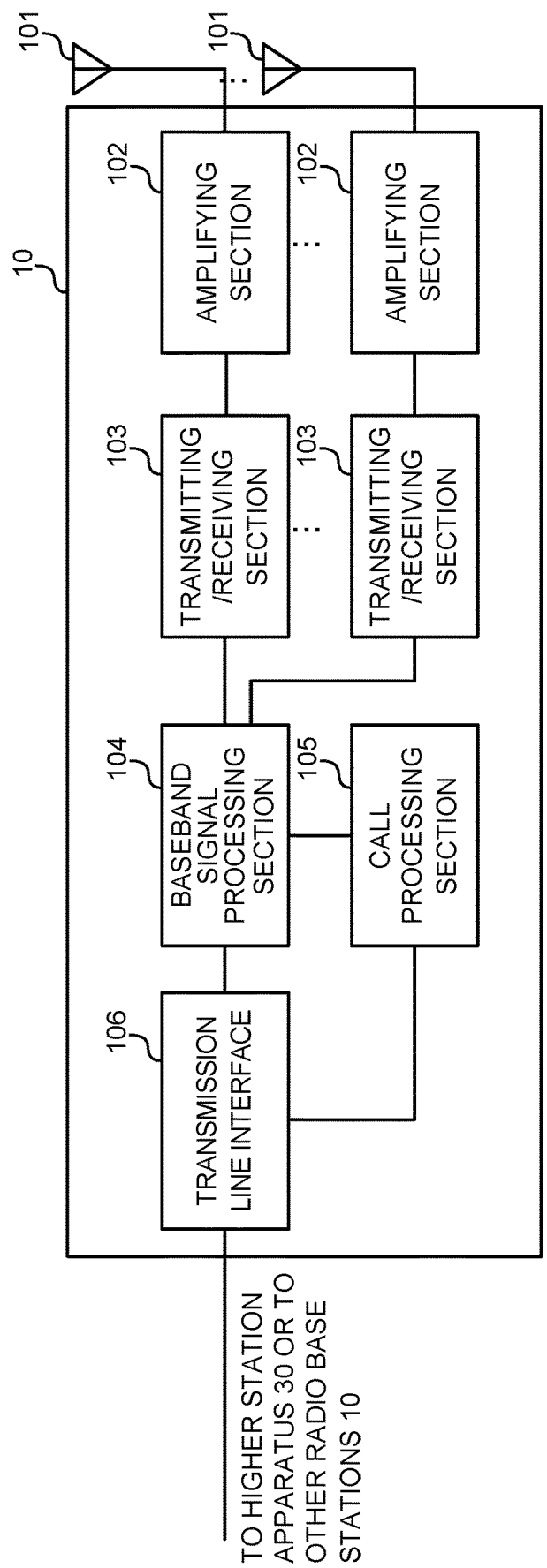
FIG. 6 is a diagram to show an example of an overall structure of a radio base station according to one embodiment.

FIG. 6 is a diagram to show an example of an overall structure of the radio base station according to one embodiment. A radio base station 10 includes a plurality of transmitting/receiving antennas 101, amplifying sections 102, transmitting/receiving sections 103, a baseband signal processing section 104, a call processing section 105 and a transmission line interface 106. Note that the radio base station 10 may be configured to include one or more transmitting/receiving antennas 101, one or more amplifying sections 102 and one or more transmitting/receiving sections 103.

User data to be transmitted from the radio base station 10 to the user terminal 20 by the downlink is input from the higher station apparatus 30 to the baseband signal processing section 104, via the transmission line interface 106.

In the baseband signal processing section 104, the user data is subjected to transmission processes, such as a PDCP (Packet Data Convergence Protocol) layer process, division and coupling of the user data, RLC (Radio Link Control) layer transmission processes such as RLC retransmission control, MAC (Medium Access Control) retransmission control (for example, an HARQ transmission process), scheduling, transport format selection, channel coding, an inverse fast Fourier transform (IFFT) process, and a pre-coding process, and the result is forwarded to each transmitting/receiving section 103. Furthermore, downlink control signals are also subjected to transmission processes such as channel coding and inverse fast Fourier transform, and the result is forwarded to each transmitting/receiving section 103.

The transmitting/receiving sections 103 convert baseband signals that are pre-coded and output from the baseband signal processing section 104 on a per antenna basis, to have radio frequency bands and transmit the result. The radio frequency signals having been subjected to frequency conversion in the transmitting/receiving sections 103 are amplified in the amplifying sections 102, and transmitted from the transmitting/receiving antennas 101. The transmitting/receiving sections 103 can be constituted with transmitters/receivers, transmitting/receiving circuits or transmitting/receiving apparatus that can be described based on general understanding of the technical field to which the present disclosure pertains. Note that each transmitting/receiving section 103 may be structured as a transmitting/receiving section in one entity, or may be constituted with a transmitting section and a receiving section.

Meanwhile, as for uplink signals, radio frequency signals that are received in the transmitting/receiving antennas 101 are amplified in the amplifying sections 102. The transmitting/receiving sections 103 receive the uplink signals amplified in the amplifying sections 102. The transmitting/receiving sections 103 convert the received signals into the baseband signal through frequency conversion and outputs to the baseband signal processing section 104.

In the baseband signal processing section 104, user data that is included in the uplink signals that are input is subjected to a fast Fourier transform (FFT) process, an inverse discrete Fourier transform (IDFT) process, error correction decoding, a MAC retransmission control receiving process, and RLC layer and PDCP layer receiving processes, and forwarded to the higher station apparatus 30 via the transmission line interface 106. The call processing section 105 performs call processing (setting up, releasing and so on) for communication channels, manages the state of the radio base station 10, manages the radio resources and so on.

The transmission line interface 106 transmits and/or receives signals to and/or from the higher station apparatus 30 via a certain interface. The transmission line interface 106 may transmit and/or receive signals (backhaul signaling) with other radio base stations 10 via an inter-base station interface (for example, an optical fiber in compliance with the CPRI (Common Public Radio Interface) and an X2 interface).

Note that the transmitting/receiving sections 103 may further include an analog beam foaming section to perform analog beam foaming. The analog beam foaming section may be constituted with an analog beam forming circuit (for example, a phase shifter, a phase shift circuit) or an analog beam foaming apparatus (for example, a phase shift apparatus) that can be described based on general understanding of the technical field to which the present invention pertains.

Also, for example, the transmitting/receiving antennas 101 may be constituted with an array antenna.

Figure 7:
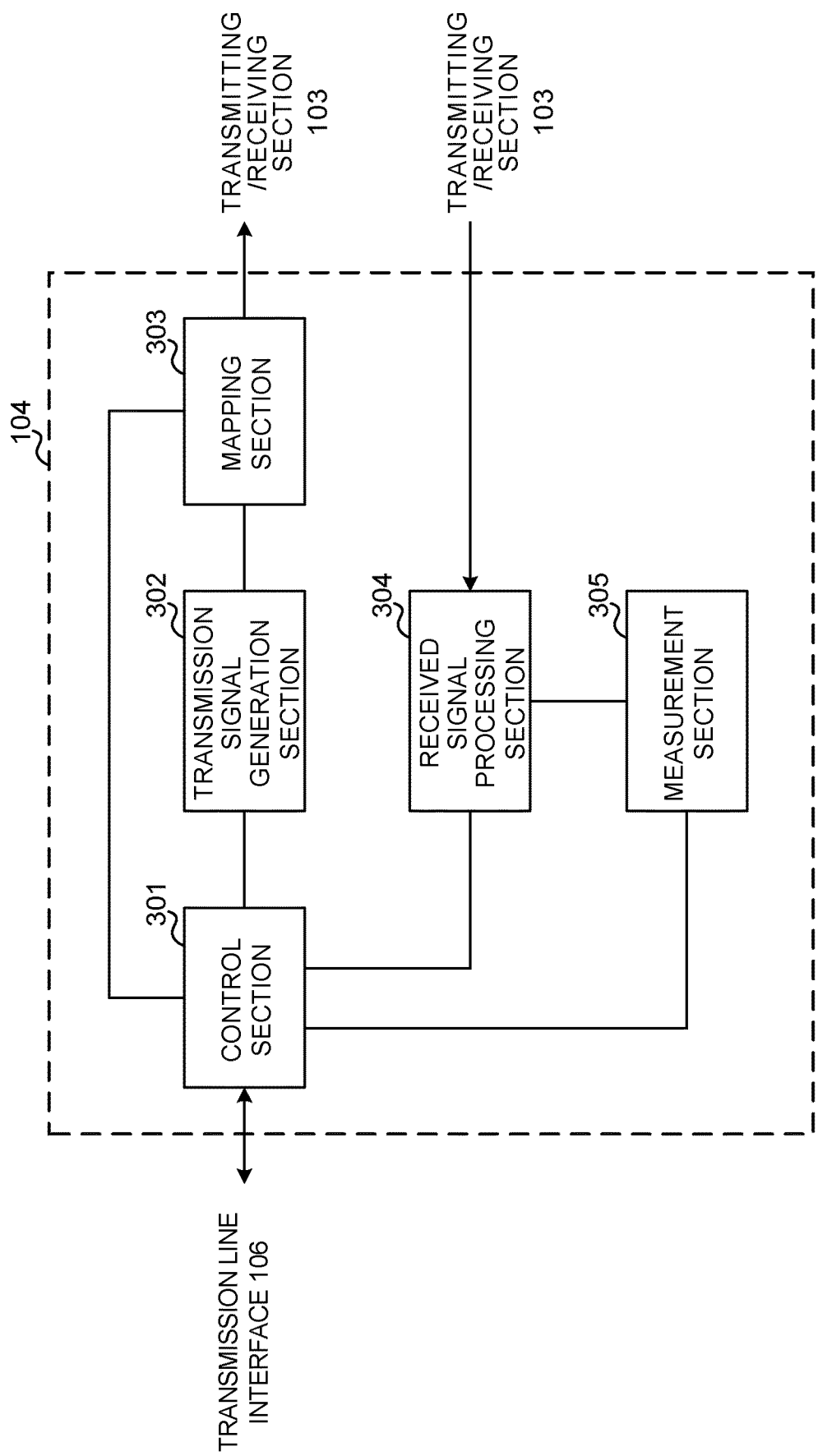
FIG. 7 is a diagram to show an example of a functional structure of the radio base station according to one embodiment.

FIG. 7 is a diagram to show an example of a functional structure of the radio base station according to one embodiment of the present disclosure. Note that, the present example primarily shows functional blocks that pertain to characteristic parts of the present embodiment, and it is assumed that the radio base station 10 may include other functional blocks that are necessary for radio communication as well.

The baseband signal processing section 104 at least includes a control section (scheduler) 301, a transmission signal generation section 302, a mapping section 303, a received signal processing section 304, and a measurement section 305. Note that these structures may be included in the radio base station 10, and some or all of the structures do not need to be included in the baseband signal processing section 104.

The control section (scheduler) 301 controls the whole of the radio base station 10. The control section 301 can be constituted with a controller, a control circuit or control apparatus that can be described based on general understanding of the technical field to which the present disclosure pertains.

The control section 301, for example, controls the generation of signals in the transmission signal generation section 302, the mapping of signals by the mapping section 303, and so on. The control section 301 controls the signal receiving processes in the received signal processing section 304, the measurements of signals in the measurement section 305, and so on.

The control section 301 controls the scheduling (for example, resource assignment) of system information, a downlink data signal (for example, a signal transmitted on the PDSCH), a downlink control signal (for example, a signal transmitted on the PDCCH and/or the EPDCCH. Transmission confirmation information, and so on). Based on the results of determining necessity or not of retransmission control to the uplink data signal, or the like, the control section 301 controls generation of a downlink control signal, a downlink data signal, and so on.

The control section 301 controls the scheduling of a synchronization signal (for example, PSS (Primary Synchronization Signal)/SSS (Secondary Synchronization Signal)), a downlink reference signal (for example, CRS, CSI-RS, DMRS), and so on.

The control section 301 controls the scheduling of an uplink data signal (for example, a signal transmitted in the PUSCH), an uplink control signal (for example, a signal transmitted in the PUCCH and/or the PUSCH. Delivery confirmation information, and the like), a random access preamble (for example, a signal transmitted in the PRACH), an uplink reference signal, and the like.

The control section 301 may perform control to form a transmit beam and/or receive beam by using digital BF (for example, precoding) in the baseband signal processing section 104 and/or analog BF (for example, phase rotation) in the transmitting/receiving sections 103. The control section 301 may perform control to form a beam, based on downlink channel information, uplink channel information, and the like. These pieces of channel information may be acquired from the received signal processing section 304 and/or the measurement section 305.

The transmission signal generation section 302 generates downlink signals (downlink control signals, downlink data signals, downlink reference signals and so on) based on commands from the control section 301 and outputs the downlink signals to the mapping section 303. The transmission signal generation section 302 can be constituted with a signal generator, a signal generation circuit or signal generation apparatus that can be described based on general understanding of the technical field to which the present disclosure pertains.

For example, the transmission signal generation section 302 generates DL assignment to report assignment information of downlink data and/or UL grant to report assignment information of uplink data, based on commands from the control section 301. The DL assignment and the UL grant are both DCI, and follow the DCI format. For a downlink data signal, encoding processing and modulation processing are performed in accordance with a coding rate, modulation scheme, or the like determined based on channel state information (CSI) from each user terminal 20.

The mapping section 303 maps the downlink signals generated in the transmission signal generation section 302 to certain radio resources, based on commands from the control section 301, and outputs these to the transmitting/receiving sections 103. The mapping section 303 can be constituted with a mapper, a mapping circuit or mapping apparatus that can be described based on general understanding of the technical field to which the present disclosure pertains.

The received signal processing section 304 performs receiving processes (for example, demapping, demodulation, decoding and so on) of received signals that are input from the transmitting/receiving sections 103. Here, the received signals are, for example, uplink signals that are transmitted from the user terminals 20 (uplink control signals, uplink data signals, uplink reference signals and so on). The received signal processing section 304 can be constituted with a signal processor, a signal processing circuit or signal processing apparatus that can be described based on general understanding of the technical field to which the present disclosure pertains.

The received signal processing section 304 outputs the decoded information acquired through the receiving processes to the control section 301. For example, if the received signal processing section 304 receives the PUCCH including HARQ-ACK, the received signal processing section 304 outputs the HARQ-ACK to the control section 301. The received signal processing section 304 outputs the received signals and/or the signals after the receiving processes to the measurement section 305.

The measurement section 305 conducts measurements with respect to the received signals. The measurement section 305 can be constituted with a measurer, a measurement circuit or measurement apparatus that can be described based on general understanding of the technical field to which the present disclosure pertains.

For example, the measurement section 305 may perform RRM (Radio Resource Management) measurement, channel estimate, and so on, based on the received signal. The measurement section 305 may measure received power (for example, RSRP (Reference Signal Received Power)), a received quality (for example, RSRQ (Reference Signal Received Quality), an SINR (Signal to Interference plus Noise Ratio), an SNR (Signal to Noise Ratio)), a signal strength (for example, RSSI (Received Signal Strength Indicator)), channel information (for example, CSI (Channel State Information)), and so on. The measurement results may be output to the control section 301.

The transmitting/receiving sections 103 transmit at least one of an SSB, a CSI-RS, an RLM-RS and an L1-RS. The transmitting/receiving sections 103 may transmit and/or receive data in a cell configured with at least one of the SSB measurement, the CSI-RS measurement, the RLM-RS measurement, and the L1 measurement. The transmitting/receiving sections 103 may transmit information about intra-frequency measurement and/or inter-frequency measurement, and the like to the user terminal 20.

(User Terminal)

Figure 8:
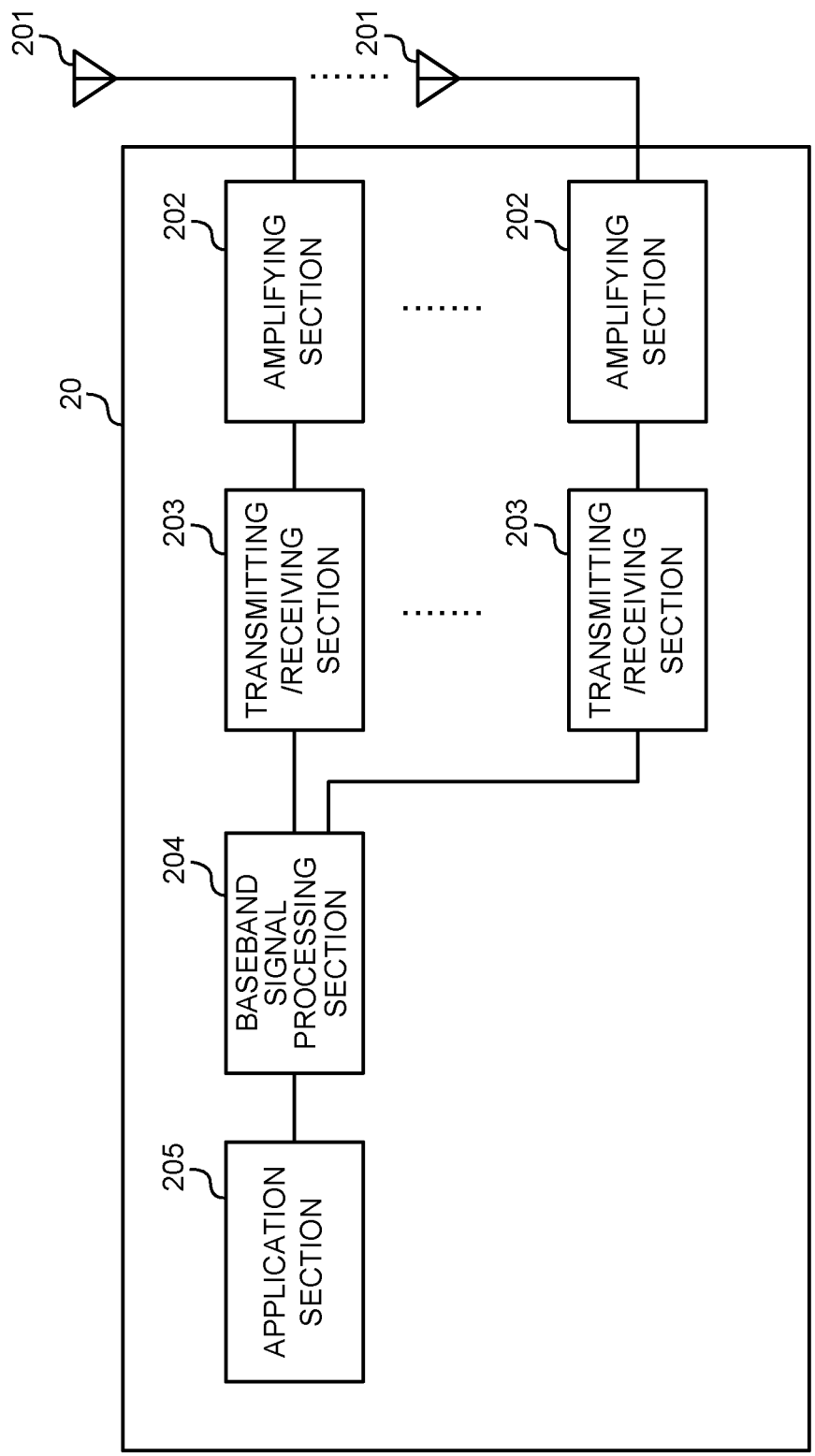
FIG. 8 is a diagram to show an example of an overall structure of a user terminal according to one embodiment.

FIG. 8 is a diagram to show an example of an overall structure of a user terminal according to one embodiment. A user terminal 20 includes a plurality of transmitting/receiving antennas 201, amplifying sections 202, transmitting/receiving sections 203, a baseband signal processing section 204 and an application section 205. Note that the user terminal 20 may be configured to include one or more transmitting/receiving antennas 201, one or more amplifying sections 202 and one or more transmitting/receiving sections 203.

Radio frequency signals that are received in the transmitting/receiving antennas 201 are amplified in the amplifying sections 202. The transmitting/receiving sections 203 receive the downlink signals amplified in the amplifying sections 202. The transmitting/receiving sections 203 convert the received signals into baseband signals through frequency conversion, and output the baseband signals to the baseband signal processing section 204. The transmitting/receiving sections 203 can be constituted with transmitters/receivers, transmitting/receiving circuits or transmitting/receiving apparatus that can be described based on general understanding of the technical field to which the present disclosure pertains. Note that each transmitting/receiving section 203 may be structured as a transmitting/receiving section in one entity, or may be constituted with a transmitting section and a receiving section.

The baseband signal processing section 204 performs, on each input baseband signal, an FFT process, error correction decoding, a retransmission control receiving process, and so on. The downlink user data is forwarded to the application section 205. The application section 205 performs processes related to higher layers above the physical layer and the MAC layer, and so on. In the downlink data, broadcast information may be also forwarded to the application section 205.

Meanwhile, the uplink user data is input from the application section 205 to the baseband signal processing section 204. The baseband signal processing section 204 performs a retransmission control transmission process (for example, an HARQ transmission process), channel coding, precoding, a discrete Fourier transform (DFT) process, an IFFT process and so on, and the result is forwarded to the transmitting/receiving section 203.

The transmitting/receiving sections 203 convert the baseband signals output from the baseband signal processing section 204 to have radio frequency band and transmit the result. The radio frequency signals having been subjected to frequency conversion in the transmitting/receiving sections 203 are amplified in the amplifying sections 202, and transmitted from the transmitting/receiving antennas 201.

Note that the transmitting/receiving sections 203 may further include an analog beam foaming section to perform analog beam foaming. The analog beam foaming section may be constituted with an analog beam forming circuit (for example, a phase shifter, a phase shift circuit) or an analog beam foaming apparatus (for example, a phase shift apparatus) that can be described based on general understanding of the technical field to which the present invention pertains. Also, for example, the transmitting/receiving antennas 201 may be constituted with an array antenna.

Figure 9:
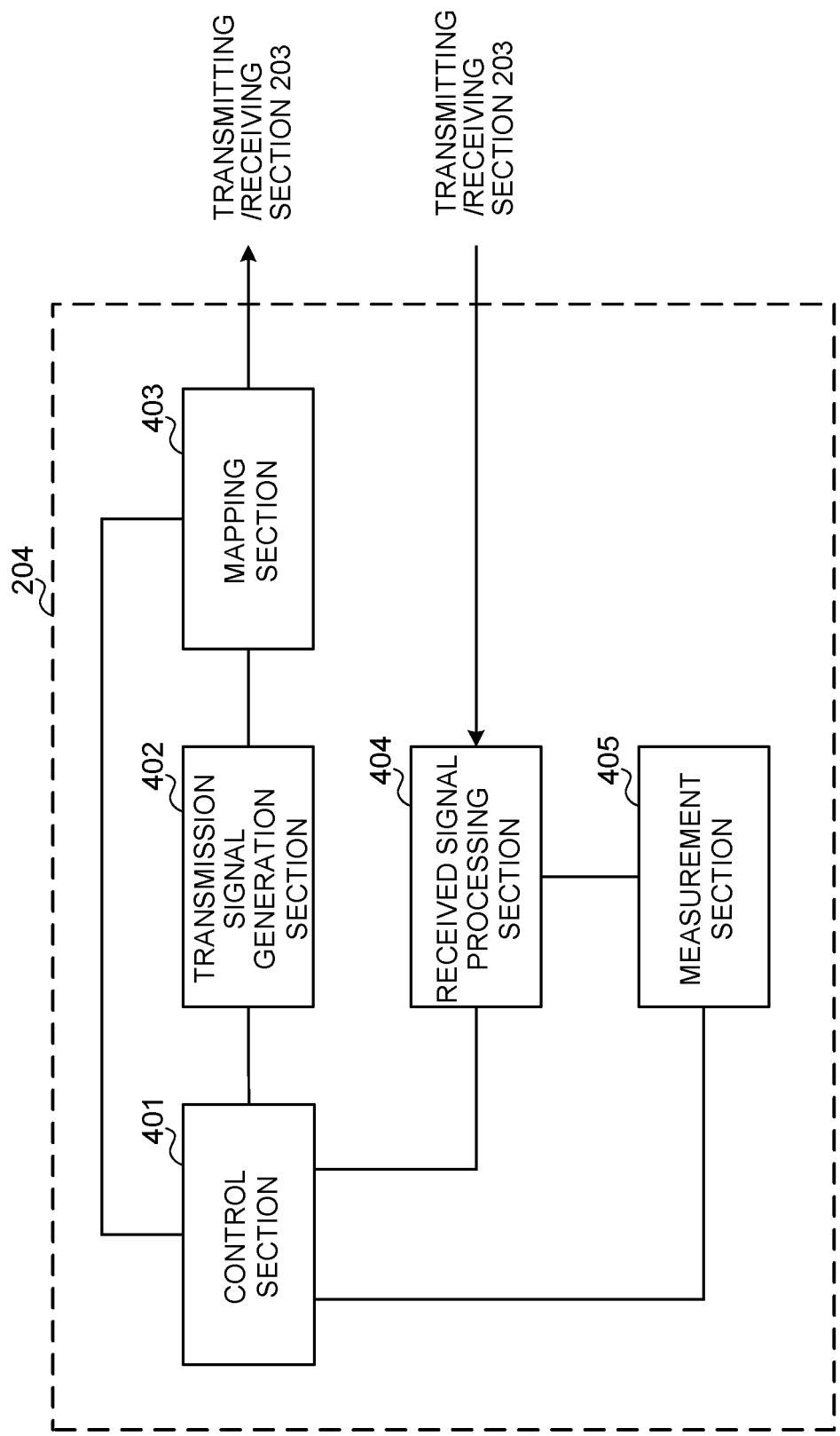
FIG. 9 is a diagram to show an example of a functional structure of the user terminal according to one embodiment.

FIG. 9 is a diagram to show an example of a functional structure of a user terminal according to one embodiment. Note that, the present example primarily shows functional blocks that pertain to characteristic parts of the present embodiment, and it is assumed that the user terminal 20 may include other functional blocks that are necessary for radio communication as well.

The baseband signal processing section 204 provided in the user terminal 20 at least includes a control section 401, a transmission signal generation section 402, a mapping section 403, a received signal processing section 404 and a measurement section 405. Note that these structures may be included in the user terminal 20, and some or all of the structures do not need to be included in the baseband signal processing section 204.

The control section 401 controls the whole of the user terminal 20. The control section 401 can be constituted with a controller, a control circuit or control apparatus that can be described based on general understanding of the technical field to which the present disclosure pertains.

The control section 401, for example, controls the generation of signals in the transmission signal generation section 402, the mapping of signals by the mapping section 403, and so on. The control section 401 controls the signal receiving processes in the received signal processing section 404, the measurements of signals in the measurement section 405, and so on.

The control section 401 acquires a downlink control signal and a downlink data signal transmitted from the radio base station 10, from the received signal processing section 404. The control section 401 controls generation of an uplink control signal and/or an uplink data signal, based on the results of determining necessity or not of retransmission control to a downlink control signal and/or a downlink data signal.

The control section 401 may perform control to form a transmit beam and/or receive beam by using digital BF (for example, precoding) in the baseband signal processing section 204 and/or analog BF (for example, phase rotation) in the transmitting/receiving sections 203. The control section 401 may perform control to form a beam, based on downlink channel information, uplink channel information, and the like. These pieces of channel information may be acquired from the received signal processing section 404 and/or the measurement section 405.

If the control section 401 acquires a variety of information reported by the radio base station 10 from the received signal processing section 404, the control section 401 may update parameters to use for control, based on the information.

The transmission signal generation section 402 generates uplink signals (uplink control signals, uplink data signals, uplink reference signals and so on) based on commands from the control section 401, and outputs the uplink signals to the mapping section 403. The transmission signal generation section 402 can be constituted with a signal generator, a signal generation circuit or signal generation apparatus that can be described based on general understanding of the technical field to which the present disclosure pertains.

For example, the transmission signal generation section 402 generates an uplink control signal about transmission confirmation information, the channel state information (CSI), and so on, based on commands from the control section 401. The transmission signal generation section 402 generates uplink data signals, based on commands from the control section 401. For example, when a UL grant is included in a downlink control signal that is reported from the radio base station 10, the control section 401 commands the transmission signal generation section 402 to generate the uplink data signal.

The mapping section 403 maps the uplink signals generated in the transmission signal generation section 402 to radio resources, based on commands from the control section 401, and outputs the result to the transmitting/receiving sections 203. The mapping section 403 can be constituted with a mapper, a mapping circuit or mapping apparatus that can be described based on general understanding of the technical field to which the present disclosure pertains.

The received signal processing section 404 performs receiving processes (for example, demapping, demodulation, decoding and so on) of received signals that are input from the transmitting/receiving sections 203. Here, the received signals are, for example, downlink signals transmitted from the radio base station 10 (downlink control signals, downlink data signals, downlink reference signals and so on). The received signal processing section 404 can be constituted with a signal processor, a signal processing circuit or signal processing apparatus that can be described based on general understanding of the technical field to which the present disclosure pertains. The received signal processing section 404 can constitute the receiving section according to the present disclosure.

The received signal processing section 404 outputs the decoded information acquired through the receiving processes to the control section 401. The received signal processing section 404 outputs, for example, broadcast information, system information, RRC signaling, DCI and so on, to the control section 401. The received signal processing section 404 outputs the received signals and/or the signals after the receiving processes to the measurement section 405.

The measurement section 405 conducts measurements with respect to the received signals. The measurement section 405 can be constituted with a measurer, a measurement circuit or a measurement apparatus that can be described based on general understanding of the technical field to which the present disclosure pertains.

For example, the measurement section 405 may perform RRM measurement, channel estimate, and so on, based on the received signal. The measurement section 405 may measure received power (for example, RSRP), received quality (for example, RSRQ, SINR, SNR), a signal strength (for example, RSSI), channel information (for example, CSI), and so on. The measurement results may be output to the control section 401.

The transmitting/receiving sections 203 receive at least one of an SSB, a CSI-RS, an RLM-RS and an L1-RS. The received RS may be used in the measurement section 405 for measurement. The transmitting/receiving sections 203 may transmit and/or receive data in a cell configured with at least one of the SSB measurement, the CSI-RS measurement, the RLM-RS measurement, and the L1 measurement.

The control section 401 may determine control (for example, availability) of the data transmission and/or reception in the measurement timing of the CSI-RS, based on whether or not the synchronous environment can be expected.

In a case that the synchronous environment can be expected, the control section 401 may not expect transmitting and/or receiving data that is different from the CSI-RS in the sub-carrier spacing, in a symbol of the CSI-RS and 1 symbol before and after the symbol.

In a case that the synchronous environment cannot be expected, the control section 401 may measure the CSI-RS of the sub-carrier spacing that is different from the data in the serving cell in the measurement gap, and in the measurement gap, may not expect the transmission and/or reception of the data in the serving cell.

In the case that the synchronous environment cannot be expected, the control section 401 may measure the CSI-RS within the configured certain period, and in the certain period, may not expect transmitting and/or receiving the data that is different from the CSI-RS in the sub-carrier spacing.

The control section 401 may expect synchronous environment in a case that there is a CSI-RS where an associated synchronization signal block is not configured among all configured CSI-RSs.

The measurement section 405 may perform at least one of the measurement for the radio link monitoring (RLM) and the L1 measurement by using a certain reference signal in a particular frequency band.

The control section 401 may control the data transmission and/or reception on the particular frequency band at the time of the measurement, based on the sub-carrier spacing (SCS) of the certain reference signal. Note that "the control of the data transmission and/or reception" may include control whether or not to transmit and/or receive data.

The control section 401 may control the data transmission and/or reception, based on a relationship between the sub-carrier spacing of the certain reference signal and the sub-carrier spacing of data.

The control section 401 may control the data transmission and/or reception by using the information indicating the UE capability associated with the RRM (Radio Resource Management) measurement.

The control section 401 may expect that the condition that the transmission and/or reception of data at the time of measurement of at least one of the measurement for the RLM and the L1 measurement is looser (more moderate) than the condition that the transmission and/or reception of data at the time of the RRM measurement. Note that "to be loose" is described in the examples described in the second embodiment and the third embodiment.

(Hardware Structure)

Note that the block diagrams that have been used to describe the above embodiments show blocks in functional units. These functional blocks (components) may be implemented in arbitrary combinations of at least one of hardware and software. Also, the method for implementing each functional block is not particularly limited. That is, each functional block may be realized by one piece of apparatus that is physically or logically coupled, or may be realized by directly or indirectly connecting two or more physically or logically separate pieces of apparatus (for example, via wire, wireless, or the like) and using these plurality of pieces of apparatus.

Figure 10:
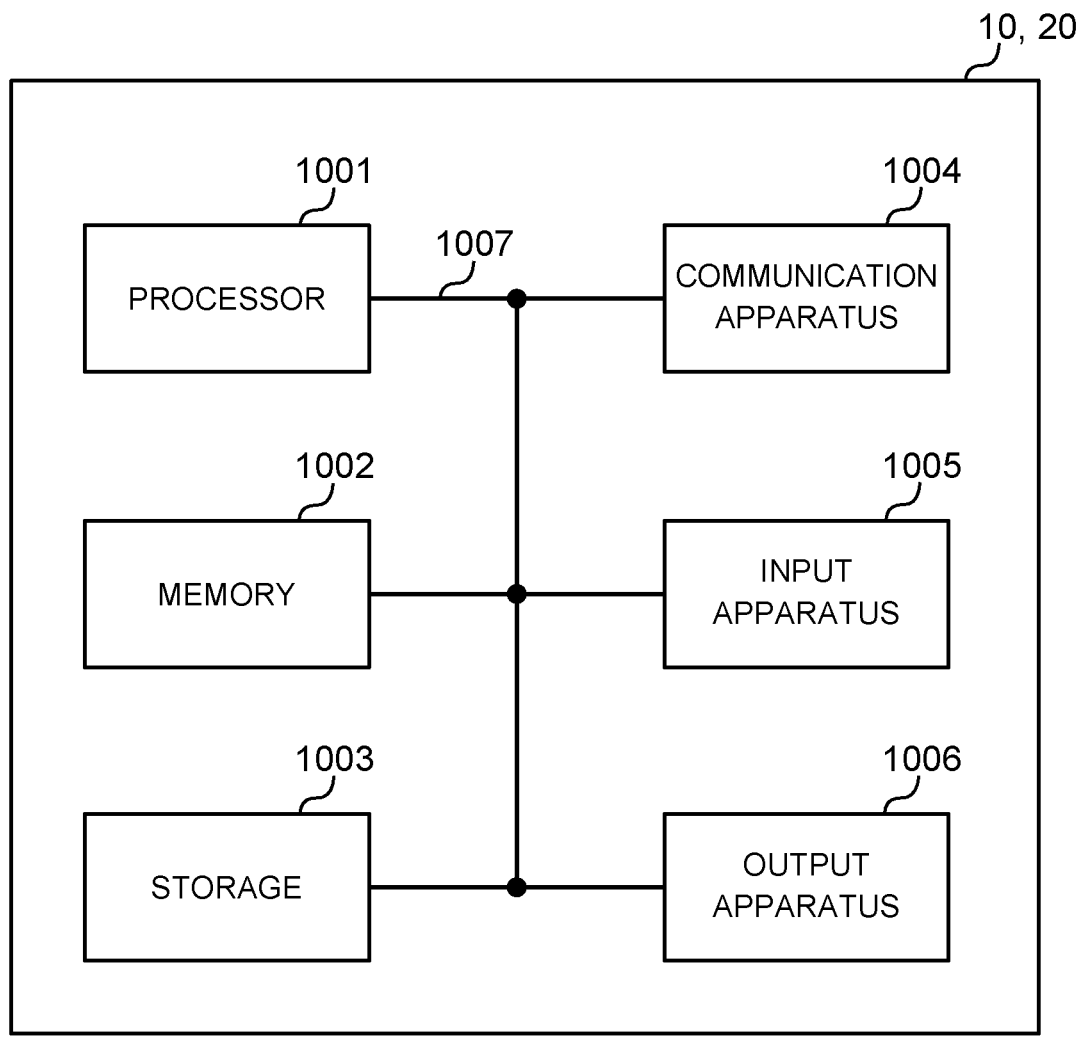
FIG. 10 is a diagram to show an example of a hardware structure of the radio base station and the user terminal according to one embodiment.

For example, a radio base station, a user terminal, and so on according to one embodiment of the present disclosure may function as a computer that executes the processes of the radio communication method of the present disclosure. FIG. 10 is a diagram to show an example of a hardware structure of the radio base station and the user terminal according to one embodiment. Physically, the above-described radio base station 10 and user terminals 20 may each be formed as computer apparatus that includes a processor 1001, a memory 1002, a storage 1003, a communication apparatus 1004, an input apparatus 1005, an output apparatus 1006, a bus 1007, and so on.

Note that, in the following description, the word "apparatus" may be interpreted as "circuit," "device," "unit," and so on. The hardware structure of the radio base station 10 and the user terminals 20 may be designed to include one or a plurality of apparatuses shown in the drawings, or may be designed not to include part of pieces of apparatus.

For example, although only one processor 1001 is shown, a plurality of processors may be provided. Furthermore, processes may be implemented with one processor or may be implemented at the same time, in sequence, or in different manners with two or more processors. Note that the processor 1001 may be implemented with one or more chips.

Each function of the radio base station 10 and the user terminals 20 is implemented, for example, by allowing certain software (programs) to be read on hardware such as the processor 1001 and the memory 1002, and by allowing the processor 1001 to perform calculations to control communication via the communication apparatus 1004 and control at least one of reading and writing of data in the memory 1002 and the storage 1003.

The processor 1001 controls the whole computer by, for example, running an operating system. The processor 1001 may be configured with a central processing unit (CPU), which includes interfaces with peripheral apparatus, control apparatus, computing apparatus, a register, and so on. For example, the above-described baseband signal processing section 104 (204), call processing section 105, and so on may be implemented by the processor 1001.

Furthermore, the processor 1001 reads programs (program codes), software modules, data, and so on from at least one of the storage 1003 and the communication apparatus 1004, into the memory 1002, and executes various processes according to these. As for the programs, programs to allow computers to execute at least part of the operations of the above-described embodiments are used.

For example, the control section 401 of each user terminal 20 may be implemented by control programs that are stored in the memory 1002 and that operate on the processor 1001, and other functional blocks may be implemented likewise.

The memory 1002 is a computer-readable recording medium, and may be constituted with, for example, at least one of a ROM (Read Only Memory), an EPROM (Erasable Programmable ROM), an EEPROM (Electrically EPROM), a RAM (Random Access Memory), and other appropriate storage media. The memory 1002 may be referred to as a "register," a "cache," a "main memory (primary storage apparatus)" and so on. The memory 1002 can store executable programs (program codes), software modules, and the like for implementing the radio communication method according to one embodiment of the present disclosure.

The storage 1003 is a computer-readable recording medium, and may be constituted with, for example, at least one of a flexible disk, a floppy (registered trademark) disk, a magneto-optical disk (for example, a compact disc (CD-ROM (Compact Disc ROM) and so on), a digital versatile disc, a Blu-ray (registered trademark) disk), a removable disk, a hard disk drive, a smart card, a flash memory device (for example, a card, a stick, and a key drive), a magnetic stripe, a database, a server, and other appropriate storage media. The storage 1003 may be referred to as "secondary storage apparatus."

The communication apparatus 1004 is hardware (transmitting/receiving device) for allowing inter-computer communication via at least one of wired and wireless networks, and may be referred to as, for example, a "network device," a "network controller," a "network card," a "communication module," and so on. The communication apparatus 1004 may be configured to include a high frequency switch, a duplexer, a filter, a frequency synthesizer, and so on in order to realize, for example, at least one of frequency division duplex (FDD) and time division duplex (TDD). For example, the above-described transmitting/receiving antennas 101 (201), amplifying sections 102 (202), transmitting/receiving sections 103 (203), transmission line interface 106, and so on may be implemented by the communication apparatus 1004.

The input apparatus 1005 is an input device that receives input from the outside (for example, a keyboard, a mouse, a microphone, a switch, a button, a sensor, and so on). The output apparatus 1006 is an output device that allows sending output to the outside (for example, a display, a speaker, an LED (Light Emitting Diode) lamp, and so on). Note that the input apparatus 1005 and the output apparatus 1006 may be provided in an integrated structure (for example, a touch panel).

Furthermore, these types of apparatus, including the processor 1001, the memory 1002, and others, are connected by a bus 1007 for communicating information. The bus 1007 may be formed with a single bus, or may be formed with buses that vary between pieces of apparatus.

Also, the radio base station 10 and the user terminals 20 may be structured to include hardware such as a microprocessor, a digital signal processor (DSP), an ASIC (Application Specific Integrated Circuit), a PLD (Programmable Logic Device), an FPGA (Field Programmable Gate Array), and so on, and part or all of the functional blocks may be implemented by the hardware. For example, the processor 1001 may be implemented with at least one of these pieces of hardware.

(Variations)

Note that the terminology described in the present disclosure and the terminology that is needed to understand the present disclosure may be replaced by other terms that convey the same or similar meanings. For example, at least one of "channels" and "symbols" may be "signals" ("signaling"). Also, "signals" may be "messages." A reference signal may be abbreviated as an "RS," and may be referred to as a "pilot," a "pilot signal," and so on, depending on which standard applies. Furthermore, a "component carrier (CC)" may be referred to as a "cell," a "frequency carrier," a "carrier frequency" and so on.

A radio frame may be constituted of one or a plurality of periods (frames) in the time domain. Each of one or a plurality of periods (frames) constituting a radio frame may be referred to as a "subframe." Furthermore, a subframe may be constituted of one or a plurality of slots in the time domain. A subframe may be a fixed time length (for example, 1 ms) independent of numerology.

Here, numerology may be a communication parameter applied to at least one of transmission and reception of a certain signal or channel. For example, numerology may indicate at least one of a subcarrier spacing (SCS), a bandwidth, a symbol length, a cyclic prefix length, a transmission time interval (TTI), the number of symbols per TTI, a radio frame structure, a particular filter processing performed by a transceiver in the frequency domain, a particular windowing processing performed by a transceiver in the time domain, and so on.

A slot may be constituted of one or a plurality of symbols in the time domain (OFDM (Orthogonal Frequency Division Multiplexing) symbols, SC-FDMA (Single Carrier Frequency Division Multiple Access) symbols, and so on). Furthermore, a slot may be a time unit based on numerology.

A slot may include a plurality of mini-slots. Each mini-slot may be constituted of one or a plurality of symbols in the time domain. A mini-slot may be referred to as a "sub-slot." A mini-slot may be constituted of symbols less than the number of slots. A PDSCH (or PUSCH) transmitted in a time unit larger than a mini-slot may be referred to as "PDSCH (PUSCH) mapping type A." A PDSCH (or PUSCH) transmitted using a mini-slot may be referred to as "PDSCH (PUSCH) mapping type B."

A radio frame, a subframe, a slot, a mini-slot, and a symbol all express time units in signal communication. A radio frame, a subframe, a slot, a mini-slot, and a symbol may each be called by other applicable terms, and may be interchangeably interpreted.

For example, one subframe may be referred to as a "transmission time interval (TTI)," a plurality of consecutive subframes may be referred to as a "TTI" or one slot or one mini-slot may be referred to as a "TTI." That is, at least one of a subframe and a TTI may be a subframe (1 ms) in existing LTE, may be a shorter period than 1 ms (for example, 1 to 13 symbols), or may be a longer period than 1 ms. Note that a unit expressing TTI may be referred to as a "slot," a "mini-slot," and so on instead of a "subframe."

Here, a TTI refers to the minimum time unit of scheduling in radio communication, for example. For example, in LTE systems, a radio base station schedules the allocation of radio resources (such as a frequency bandwidth and transmission power that are available for each user terminal) for the user terminal in TTI units. Note that the definition of TTIs is not limited to this.

TTIs may be transmission time units for channel-encoded data packets (transport blocks), code blocks, codewords, or the like, or may be the unit of processing in scheduling, link adaptation, and so on. Note that, when TTIs are given, the time interval (for example, the number of symbols) to which transport blocks, code blocks, codewords, or the like are actually mapped may be shorter than the TTIs.

Note that, in the case where one slot or one mini-slot is referred to as a TTI, one or more TTIs (that is, one or more slots or one or more mini-slots) may be the minimum time unit of scheduling. Furthermore, the number of slots (the number of mini-slots) constituting the minimum time unit of the scheduling may be controlled.

A TTI having a time length of 1 ms may be referred to as a "normal TTI" (TTI in LTE Rel. 8 to Rel. 12), a "long TTI," a "normal subframe," a "long subframe," a "slot" and so on. A TTI that is shorter than a normal TTI may be referred to as a "shortened TTI," a "short TTI," a "partial or fractional TTI," a "shortened subframe," a "short subframe," a "mini-slot," a "sub-slot," a "slot" and so on.

Note that a long TTI (for example, a normal TTI, a subframe, and so on) may be interpreted as a TTI having a time length exceeding 1 ms, and a short TTI (for example, a shortened TTI and so on) may be interpreted as a TTI having a TTI length shorter than the TTI length of a long TTI and equal to or longer than 1 ms.

A resource block (RB) is the unit of resource allocation in the time domain and the frequency domain, and may include one or a plurality of consecutive subcarriers in the frequency domain.

Also, an RB may include one or a plurality of symbols in the time domain, and may be one slot, one mini-slot, one subframe, or one TTI in length. One TTI and one subframe each may be constituted of one or a plurality of resource blocks.

Note that one or a plurality of RBs may be referred to as a "physical resource block (PRB (Physical RB))," a "sub-carrier group (SCG)," a "resource element group (REG)," a "PRB pair," an "RB pair" and so on.

Furthermore, a resource block may be constituted of one or a plurality of resource elements (REs). For example, one RE may correspond to a radio resource field of one subcarrier and one symbol.

Note that the above-described structures of radio frames, subframes, slots, mini-slots, symbols, and so on are merely examples. For example, structures such as the number of subframes included in a radio frame, the number of slots per subframe or radio frame, the number of mini-slots included in a slot, the numbers of symbols and RBs included in a slot or a mini-slot, the number of subcarriers included in an RB, the number of symbols in a TTI, the symbol length, the cyclic prefix (CP) length, and so on can be variously changed.

Also, the information, parameters, and so on described in the present disclosure may be represented in absolute values or in relative values with respect to certain values, or may be represented in another corresponding information. For example, radio resources may be specified by certain indices.

The names used for parameters and so on in the present disclosure are in no respect limiting. Furthermore, mathematical expressions that use these parameters, and so on may be different from those expressly disclosed in the present disclosure. Since various channels (PUCCH (Physical Uplink Control Channel), PDCCH (Physical Downlink Control Channel), and so on) and information elements can be identified by any suitable names, the various names assigned to these individual channels and information elements are in no respect limiting.

The information, signals, and so on described in the present disclosure may be represented by using any of a variety of different technologies. For example, data, instructions, commands, information, signals, bits, symbols, chips, and so on, all of which may be referenced throughout the herein-contained description, may be represented by voltages, currents, electromagnetic waves, magnetic fields or particles, optical fields or photons, or any combination of these.

Also, information, signals, and so on can be output in at least one of from higher layers to lower layers and from lower layers to higher layers. Information, signals, and so on may be input and/or output via a plurality of network nodes.

The information, signals, and so on that are input and/or output may be stored in a specific location (for example, a memory) or may be managed by using a management table. The information, signals, and so on to be input and/or output can be overwritten, updated, or appended. The information, signals, and so on that are output may be deleted. The information, signals, and so on that are input may be transmitted to another apparatus.

Reporting of information is by no means limited to the aspects/embodiments described in the present disclosure, and other methods may be used as well. For example, reporting of information may be implemented by using physical layer signaling (for example, downlink control information (DCI), uplink control information (UCI), higher layer signaling (for example, RRC (Radio Resource Control) signaling, broadcast information (master information block (MIB), system information blocks (SIBs), and so on), MAC (Medium Access Control) signaling and so on), and other signals and/or combinations of these.

Note that physical layer signaling may be referred to as "L1/L2 (Layer 1/Layer 2) control information (L1/L2 control signals)," "L1 control information (L1 control signal)," and so on. Also, RRC signaling may be referred to as an "RRC message," and can be, for example, an RRC connection setup (RRCConnectionSetup) message, an RRC connection reconfiguration (RRCConnectionReconfiguration) message, and so on. Also, MAC signaling may be reported using, for example, MAC control elements (MAC CEs).

Also, reporting of certain information (for example, reporting of "X holds") does not necessarily have to be reported explicitly, and can be reported implicitly (by, for example, not reporting this certain information or reporting another piece of information).

Determinations may be made in values represented by one bit (0 or 1), may be made in Boolean values that represent true or false, or may be made by comparing numerical values (for example, comparison against a certain value).

Software, whether referred to as "software," "firmware," "middleware," "microcode," or "hardware description language," or called by other terms, should be interpreted broadly to mean instructions, instruction sets, code, code segments, program codes, programs, subprograms, software modules, applications, software applications, software packages, routines, subroutines, objects, executable files, execution threads, procedures, functions, and so on.

Also, software, commands, information, and so on may be transmitted and received via communication media. For example, when software is transmitted from a website, a server, or other remote sources by using at least one of wired technologies (coaxial cables, optical fiber cables, twisted-pair cables, digital subscriber lines (DSL), and so on) and wireless technologies (infrared radiation, microwaves, and so on), at least one of these wired technologies and wireless technologies are also included in the definition of communication media.

The terms "system" and "network" used in the present disclosure are used interchangeably.

In the present disclosure, the terms such as a "base station (BS)," a "radio base station," a "fixed station," a "NodeB," an "eNodeB (eNB)," a "gNodeB (gNB)," an "access point," a "transmission point," a "reception point," a "transmission/reception point," a "cell," a "sector," a "cell group," a "carrier," a "component carrier," a "bandwidth part (BWP)," and so on can be used interchangeably. The base station may be referred to as the terms such as a "macro cell," a small cell," a "femto cell," a "pico cell," and so on.

A base station can accommodate one or a plurality of (for example, three) cells (also referred to as "sectors"). When a base station accommodates a plurality of cells, the entire coverage area of the base station can be partitioned into multiple smaller areas, and each smaller area can provide communication services through base station subsystems (for example, indoor small base stations (RRHs (Remote Radio Heads))). The term "cell" or "sector" refers to part of or the entire coverage area of at least one of a base station and a base station subsystem that provides communication services within this coverage.

In the present disclosure, the terms "mobile station (MS)," "user terminal," "user equipment (UE)," "terminal", and the like may be used interchangeably.

A mobile station may be referred to as a "subscriber station," "mobile unit," "subscriber unit," "wireless unit," "remote unit," "mobile device," "wireless device," "wireless communication device," "remote device," "mobile subscriber station," "access terminal," "mobile terminal," "wireless terminal," "remote terminal," "handset," "user agent," "mobile client," "client," or some other appropriate terms in some cases.

At least one of a base station and a mobile station may be referred to as a "transmitting apparatus," a "receiving apparatus," and so on. Note that at least one of a base station and a mobile station may be device mounted on a mobile body or a mobile body itself, and so on. The mobile body may be a vehicle (for example, a car, an airplane, and the like), may be a mobile body which moves unmanned (for example, a drone, an automatic operation car, and the like), or may be a robot (a manned type or unmanned type). Note that at least one of a base station and a mobile station also includes an apparatus which does not necessarily move during communication operation.

Furthermore, the radio base station in the present disclosure may be interpreted as a user terminal. For example, each aspect/embodiment of the present disclosure may be applied to the structure that replaces a communication between a radio base station and a user terminal with a communication between a plurality of user terminals (for example, which may be referred to as "D2D (Device-to-Device)," "V2X (Vehicle-to-Everything)," and the like). In this case, the user terminals 20 may have the functions of the radio base stations 10 described above. The words "uplink" and "downlink" may be interpreted as the words corresponding to the terminal-to-terminal communication (for example, "side"). For example, an uplink channel, a downlink channel and so on may be interpreted as a side channel.

Likewise, the user terminal in the present disclosure may be interpreted as a radio base station. In this case, the radio base stations 10 may have the functions of the user terminals 20 described above.

Actions which have been described in the present disclosure to be performed by a base station may, in some cases, be performed by upper nodes. In a network including one or a plurality of network nodes with base stations, it is clear that various operations that are performed to communicate with terminals can be performed by base stations, one or more network nodes (for example, MMEs (Mobility Management Entities), S-GW (Serving-Gateways), and so on may be possible, but these are not limiting) other than base stations, or combinations of these.

The aspects/embodiments illustrated in the present disclosure may be used individually or in combinations, which may be switched depending on the mode of implementation. The order of processes, sequences, flowcharts, and so on that have been used to describe the aspects/embodiments in the present disclosure may be re-ordered as long as inconsistencies do not arise. For example, although various methods have been illustrated in the present disclosure with various components of steps in exemplary orders, the specific orders that are illustrated herein are by no means limiting.

The aspects/embodiments illustrated in the present disclosure may be applied to LTE (Long Term Evolution), LTE-A (LTE-Advanced), LTE-B (LTE-Beyond), SUPER 3G, IMT-Advanced, 4G (4th generation mobile communication system), 5G (5th generation mobile communication system), FRA (Future Radio Access), New-RAT (Radio Access Technology), NR(New Radio), NX (New radio access), FX (Future generation radio access), GSM (registered trademark) (Global System for Mobile communications), CDMA 2000, UMB (Ultra Mobile Broadband), IEEE 802.11 (Wi-Fi (registered trademark)), IEEE 802.16 (WiMAX (registered trademark)), IEEE 802.20, UWB (Ultra-WideBand), Bluetooth (registered trademark), systems that use other adequate radio communication methods and next-generation systems that are enhanced based on these. A plurality of systems may be combined (for example, a combination of LTE or LTE-A and 5G, and the like) and applied.

The phrase "based on" (or "on the basis of") as used in the present disclosure does not mean "based only on" (or "only on the basis of"), unless otherwise specified. In other words, the phrase "based on" (or "on the basis of") means both "based only on" and "based at least on" ("only on the basis of" and "at least on the basis of").

Reference to elements with designations such as "first," "second," and so on as used in the present disclosure does not generally limit the quantity or order of these elements. These designations may be used in the present disclosure only for convenience, as a method for distinguishing between two or more elements. Thus, reference to the first and second elements does not imply that only two elements may be employed, or that the first element must precede the second element in some way.

The term "judging (determining)" as in the present disclosure herein may encompass a wide variety of actions. For example, "judging (determining)" may be interpreted to mean making "judgments (determinations)" about judging, calculating, computing, processing, deriving, investigating, looking up (for example, searching a table, a database, or some other data structures), ascertaining, and so on.

Furthermore, "judging (determining)" may be interpreted to mean making "judgments (determinations)" about receiving (for example, receiving information), transmitting (for example, transmitting information), input, output, accessing (for example, accessing data in a memory), and so on.

In addition, "judging (determining)" as used herein may be interpreted to mean making "judgments (determinations)" about resolving, selecting, choosing, establishing, comparing, and so on. In other words, "judging (determining)" may be interpreted to mean making "judgments (determinations)" about some action.

In addition, "judging (determining)" may be interpreted as "assuming," "expecting," "considering," and the like.

The terms "connected" and "coupled," or any variation of these terms as used in the present disclosure mean all direct or indirect connections or coupling between two or more elements, and may include the presence of one or more intermediate elements between two elements that are "connected" or "coupled" to each other. The coupling or connection between the elements may be physical, logical, or a combination thereof. For example, "connection" may be interpreted as "access."

In the present disclosure, when two elements are connected, the two elements may be considered "connected" or "coupled" to each other by using one or more electrical wires, cables, printed electrical connections, or the like, and, as some non-limiting and non-inclusive examples, by using electromagnetic energy having wavelengths in radio frequency regions, microwave regions, (both visible and invisible) optical regions, or the like.

In the present disclosure, the phrase "A and B are different" may mean that "A and B are different from each other." The terms "separate," "be coupled" and so on may be interpreted similarly.

When terms such as "include," "including," and variations of these are used in the present disclosure, these terms are intended to be inclusive, in a manner similar to the way the term "comprising" is used. Furthermore, the term "or" as used in the present disclosure is intended to be not an exclusive disjunction.

For example, in the present disclosure, when an article such as "a," "an," and "the" in the English language is added by translation, the present disclosure may include that a noun after these articles is in a plural form.

Now, although the invention according to the present disclosure has been described in detail above, it should be obvious to a person skilled in the art that the invention according to the present disclosure is by no means limited to the embodiments described in the present disclosure. The invention according to the present disclosure can be implemented with various corrections and in various modifications, without departing from the spirit and scope of the invention defined by the recitations of claims. Consequently, the description of the present disclosure is provided only for the purpose of explaining examples, and should by no means be construed to limit the invention according to the present disclosure in any way.

What is claimed is:

1. A terminal comprising:
    a measurement circuit that performs a radio link monitoring (RLM) measurement using an RLM reference signal (RLM-RS); and
    a transmitting and receiving circuit,
    wherein, in Frequency Range 1 (FR1), when the RLM-RS is a synchronization signal block (SSB) and the terminal does not have a capability of simultaneous transmission or reception of data and an SSB with different numerologies, the transmitting and receiving circuit does not transmit or receive data on symbols of the RLM-RS, the data being with a different subcarrier spacing (SCS) than an SCS of the RLM-RS,
    wherein, in synchronous environment of the FR1, the transmitting and receiving circuit does not transmit or receive data on symbols of a reference signal for a radio resource management measurement (RRM-RS) and on one symbol before and after the symbols, the data being with a different SCS than an SCS of the RRM-RS, and
    wherein, in Frequency Range 2 (FR2), if the RLM-RS is a quasi-co-located reference signal with active transmission configuration indicator state (TCI-state), then the transmitting and receiving circuit can transmit or receive data on symbols of the RLM-RS.

2. The terminal according to claim 1, wherein, in the FR2, if the RLM-RS is not the quasi-co-located reference signal with the active TCI-state, then:
    the transmitting and receiving circuit does not transmit or receive data on the symbols of the RLM-RS.

3. The terminal according to claim 1, wherein when intra-band carrier aggregation is configured in the FR1 or in the FR2, a scheduling restriction on data in a secondary serving cell is the same as a scheduling restriction on data in a primary cell or a primary secondary cell.

4. The terminal according to claim 1, wherein when inter-band carrier aggregation is configured in the FR1, there are no scheduling restrictions on data in a secondary serving cell.

5. The terminal according to claim 1, wherein when FR1-FR2 inter-band carrier aggregation is configured, there are no scheduling restrictions on the data in a secondary serving cell.

6. The terminal according to claim 1, wherein, in FR2, the transmitting and receiving circuit does not transmit or receive data on symbols of the RRM-RS and on one symbol before and after the symbols.

7. The terminal according to claim 1, wherein the synchronous environment of the FR1 corresponds to a case where a measurement target frequency for the FR1 is in a Time Division Duplex (TDD) band, or corresponds to a case where information about whether an index of SSB transmitted by a neighbour cell may be derived based on a timing of a serving cell is enabled in the FR1.

8. A radio communication method for a terminal comprising:
    performing a radio link monitoring (RLM) measurement using an RLM reference signal (RLM-RS); and
    in Frequency Range 1 (FR1), when the RLM-RS is a synchronization signal block (SSB) and the terminal does not have a capability of simultaneous transmission or reception of data and an SSB with different numerologies, not transmitting or receiving data on symbols of the RLM-RS, the data being with a different subcarrier spacing (SCS) than an SCS of the RLM-RS,
    in synchronous environment of the FR1, not transmitting or receiving data on symbols of a reference signal for a radio resource management measurement (RRM-RS) and on one symbol before and after the symbols, the data being with a different SCS than an SCS of the RRM-RS, and
    wherein, in Frequency Range 2 (FR2), in response to the RLM-RS being a quasi-co-located reference signal with active transmission configuration indicator state (TCI-state), the terminal can transmit or receive data on symbols of the RLM-RS.

9. A system comprising a terminal and a base station, wherein the terminal comprises:
    a measurement circuit that performs a radio link monitoring (RLM) measurement using an RLM reference signal (RLM-RS); and
    a transmitting and receiving circuit,
    wherein, in Frequency Range 1 (FR1), when the RLM-RS is a synchronization signal block (SSB) and the terminal does not have a capability of simultaneous transmission or reception of data and an SSB with different numerologies, the transmitting and receiving circuit does not transmit or receive data on symbols of the RLM-RS, the data being with a different subcarrier spacing (SCS) than an SCS of the RLM-RS,
    wherein, in synchronous environment of the FR1, the transmitting and receiving circuit does not transmit or receive data on symbols of a reference signal for a radio resource management measurement (RRM-RS) and on one symbol before and after the symbols, the data being with a different SCS than an SCS of the RRM- RS,
    wherein, in Frequency Range 2 (FR2), if the RLM-RS is a quasi-co-located reference signal with active transmission configuration indicator state (TCI-state), then the transmitting and receiving circuit can transmit or receive data on symbols of the RLM-RS, and
    wherein the base station comprises: a transmitter that transmits the RLM-RS.

* * * * *